United States Patent
Kudo et al.

(10) Patent No.: US 7,242,552 B2
(45) Date of Patent: Jul. 10, 2007

(54) CUSHIONING MATERIAL AND INFORMATION STORAGE DEVICE USING THE SAME

(75) Inventors: Yasuyuki Kudo, Miyagi (JP); Takatsugu Funawatari, Miyagi (JP)

(73) Assignee: Sony Corporation, Tokyo (JP)

( * ) Notice: Subject to any disclaimer, the term of this patent is extended or adjusted under 35 U.S.C. 154(b) by 99 days.

(21) Appl. No.: 10/680,682

(22) Filed: Oct. 7, 2003

(65) Prior Publication Data
US 2004/0070867 A1    Apr. 15, 2004

(30) Foreign Application Priority Data
Oct. 11, 2002    (JP) ............................ P2002-299542

(51) Int. Cl.
*G11B 33/08*    (2006.01)
(52) U.S. Cl. ............................... 360/97.02; 360/97.01; 361/685
(58) Field of Classification Search ............ 360/97.01, 360/97.02, 97.03, 98.01, 133; 361/685
See application file for complete search history.

(56) References Cited

U.S. PATENT DOCUMENTS

| | | | | |
|---|---|---|---|---|
| 5,349,486 A * | 9/1994 | Sugimoto et al. | ........ | 360/97.01 |
| 5,392,920 A * | 2/1995 | Prete | ............ | 206/586 |
| 5,406,456 A * | 4/1995 | Hsu | ............ | 361/752 |
| 5,426,562 A * | 6/1995 | Morehouse et al. | ........ | 361/685 |
| 5,469,311 A * | 11/1995 | Nishida et al. | .......... | 360/97.02 |
| 5,666,239 A * | 9/1997 | Pottebaum | ............. | 360/97.03 |
| 5,677,813 A * | 10/1997 | Yoshida et al. | .......... | 360/97.02 |
| 5,799,796 A * | 9/1998 | Azelton et al. | ............. | 206/586 |
| 5,826,726 A * | 10/1998 | Yang | ............ | 206/586 |
| 6,005,768 A * | 12/1999 | Jo | .............. | 361/685 |
| 6,039,184 A * | 3/2000 | Gale | ............. | 206/586 |
| 6,094,342 A * | 7/2000 | Dague et al. | ............... | 361/685 |
| 6,116,042 A * | 9/2000 | Purdum | ....................... | 62/371 |
| 6,243,228 B1 * | 6/2001 | Yoshida et al. | .......... | 360/97.02 |
| 6,261,653 B1 * | 7/2001 | Smith | ........................ | 428/35.7 |
| 6,283,438 B1 * | 9/2001 | Shimada et al. | ............ | 248/694 |
| 6,324,054 B1 * | 11/2001 | Chee et al. | ................ | 361/685 |
| 6,339,531 B1 * | 1/2002 | McKain et al. | ............. | 361/685 |
| 6,371,433 B2 * | 4/2002 | Anderson et al. | ........... | 248/562 |
| 6,405,866 B2 * | 6/2002 | Arima | ........................ | 206/453 |
| 6,477,042 B1 * | 11/2002 | Allgeyer et al. | ............ | 361/685 |
| 6,487,039 B1 * | 11/2002 | Bernett | .................... | 360/97.02 |
| 6,629,608 B2 * | 10/2003 | Hurley et al. | ................ | 206/586 |
| 6,661,604 B2 * | 12/2003 | Hashizume et al. | ...... | 360/97.02 |
| 6,671,124 B2 * | 12/2003 | Guion et al. | ............ | 360/97.02 |
| 6,697,218 B2 * | 2/2004 | Yoshida et al. | ........... | 360/97.02 |
| 6,798,656 B1 * | 9/2004 | Lin | .............. | 361/690 |

* cited by examiner

*Primary Examiner*—Jefferson Evans
(74) *Attorney, Agent, or Firm*—Sonnenschein Nath & Rosenthal LLP

(57) ABSTRACT

A cushioning material providing sufficient cushioning effect and an information storage device having the cushioning material are provided. The cushioning material has a space therein to cover a part of an inner housing coming in contact with an outer surface of the inner housing and projections formed toward an outer housing, each projection having a contact surface coming in contact with an inner surface of the outer housing, the contact surface being formed to extend along the inner surface. The information storage device is removably mounted on a device body and has a hard disk driving mechanism, a first housing for accommodating the hard disk driving mechanism, a second housing for accommodating the first housing, and a connector portion, wherein the first housing is supported by the cushioning material to have a distance between the first housing and the second housing.

6 Claims, 27 Drawing Sheets

CUSHIONING MATERIAL AND INFORMATION STORAGE DEVICE USING THE SAME

CROSS REFERENCE TO RELATED APPLICATIONS

The present document is based on Japanese Priority Document JP2002-299542, filed in the Japanese Patent Office on Oct. 11, 2002, the entire contents of which being incorporated herein by reference.

BACKGROUND OF THE INVENTION

1. Field of the Invention

The present invention relates to a cushioning material provided between an inner housing and an outer housing and to an information storage device formed to have the cushioning material.

2. Description of Related Art

Hard disk drives (HDDs) play an important role as a recording/reproducing device for writing data or programs and reading recorded data and or the like in an information processing apparatus such as a personal computer.

The HDD is not only used as a main body of the information processing apparatus but also considered as a small information storage device (DHD) which is an external or so-called detachable extension device removably mounted on the main body of the information processing apparatus. Such an information recording device is removed from the main body of the information processing apparatus as required, and the removed device may be carried by itself or kept separately from the main body of the information processing apparatus. In addition, the device may be mounted on a portable apparatus for use.

When the HDD is mounted on an information processing apparatus, for example, some problems may occur in that the HDD requires a long time period for read or write operation due to effect of vibration or shock on the HDD through the information processing apparatus, or the information recording device may be dropped inadvertently while the device is carried as described above to cause the HDD to be broken due to the shock at the time of the drop.

The above-mentioned external information recording device typically has an HDD accommodated in a housing (for example, see Patent Document 1).

It is contemplated that the information recording device is configured to have a cushioning material made of sponge or the like in the housing for the purpose of protecting the HDD from the above-mentioned shock or vibration. However, such a cushioning material cannot be disposed in a low strength portion of the HDD such as a wiring board portion and the center of a top cover portion, which means that the cushioning material is provided partially for the housing. Thus, the cushioning material made of sponge or the like cannot achieve sufficient effect of shock absorption.

To avoid this, it is conceivable to use a cushioning material made of an elastic body such as rubber and gel or a viscoelastic body with higher elasticity than sponge. FIG. 27 shows a perspective view of an example of such a cushioning material.

This cushioning material 200 has a space 201 formed therein to come in contact with the housing for covering at least part of an inner housing. The cushioning material 200 has, as outer surfaces, a top surface 202A and a bottom surface 202B, and side surfaces 202C and 202D in two directions (an X direction and a Y direction) which are formed as contact surfaces to come in contact with inner surfaces of an outer housing.

The cushioning material 200 formed as above can convert shock energy from the outside into thermal energy through transformation to absorb the shock.

FIG. 28 shows an exemplary arrangement of the cushioning material 200 within housings. In this case, cushioning materials are provided at corners between an inside housing (an inner housing) and an outside housing (an outer housing). According no cushioning materials are provided in a low strength portion of an HDD such as a wiring board portion and the center of a top cover portion, it is expected that the effect of protecting the HDD to absorb shock is achieved.

[Patent Document 1]

Japanese Patent Publication No. 6-66111

The cushioning material is subject to significant deformation. Especially when an item to be protected by the cushioning material (a target item to be protected) receives a shock, the cushioning material is deformed in nature to the extent that it does not hold its original shape at all for an instant if no physical limitations are imposed on the cushioning material. This nature is seen with varying degrees when sponge is used and rubber or gel is used as the cushioning material.

In actual design, however, physical limitations are imposed which may prevent the cushioning material from being deformed sufficiently even when the cushioning material is provided. The cushioning material 200 shown in FIG. 27 has the cushioning effect as a material characteristic. However, when the cushioning materials 200 are disposed, for example as shown in FIG. 28, the cushioning materials 200 are surrounded by the inner housing and the outer housing and have no room for deformation. This makes it impossible to sufficiently deform the cushioning materials 200 when it receives a shock. Since the deformation of the cushioning materials is not promoted, the cushioning materials become harder when it receives a shock from the outside, and shock acceleration to the item to be protected by the cushioning material is not greatly reduced. As a result, the effect of shock absorption cannot be exerted sufficiently.

As described above, it is difficult for the conventional configuration to provide sufficient shock resistance of the HDD.

SUMMARY OF THE INVENTION

To solve the above-mentioned problem, the present invention provides a cushioning material in which deformation is promoted to provide sufficient cushioning effect, and an information storage device which has the cushioning material to achieve improved shock resistance.

A cushioning material according to an embodiment of the present invention supports an inner first housing and an outer second housing to have a distance between the first and second housings, the cushioning material has a main body having a space to come in contact with an outer surface of the first housing for covering at least part of the first housing, and at least one projection portion formed to protrude from the main body toward the second housing. The projection portion has a contact surface to come in contact with an inner surface of the second housing, and the contact surface is formed to extend along the inner surface.

According to the above-mentioned structure of the cushioning material of the present invention, since the main body has the space formed therein to come in contact with the outer surface of the first housing for covering at least part of the first housing, the cushioning material can fit to the first housing by means of the space. The cushioning material has at least one projection portion formed to protrude from the main body toward the second housing, and the projection portion has the contact surface to come in contact with the inner surface of the second housing and extending along the inner surface. The contact surface allows the cushioning material to come in contact with the inner surface of the second housing. In addition, since space in which the cushioning material is not present exists between the main body and the inner surface of the second housing, the projection portion of the cushioning material can be deformed in the space to absorb shock.

A cushioning material according to another aspect of the present invention supports an inner first housing and an outer second housing to have a distance between the first and second housings, the cushioning material has a space therein to come in contact with an outer surface of the first housing to cover at least part of the first housing, a contact surface formed on an outer surface of the cushioning material to come in contact with an inner surface of the second housing, and a hole formed in at least part of the contact surface to promote deformation.

According to the above-mentioned structure of the cushioning material of the present invention, since the main body has the space formed therein to come in contact with the outer surface of the first housing for covering at least part of the first housing, the cushioning material can fit to the first housing by means of the space. In addition, since the cushioning material has the contact surface formed on the outer surface to come in contact with the inner surface of the second housing, the contact surface allows the cushioning material to come in contact with the inner surface of the second housing. The hole for promoting deformation is formed in at least part of the contact surface, so that a portion of the cushioning material near the contact surface can be deformed in the hole to absorb shock.

An information storage device according to an embodiment of the present invention is removably mounted on a device body, including a hard disk driving mechanism, a first housing for accommodating the hard disk driving mechanism therein, a second housing for accommodating the first housing therein, and a connector portion, wherein the first housing is supported by a cushioning material to have a distance between the first housing and the second housing, and the cushioning material has a main body having a space therein to come in contact with an outer surface of the first housing to cover at least part of the first housing and has at least one projection portion formed to protrude from the main body toward the second housing. The projection has a contact surface to come in contact with an inner surface of the second housing, and the contact surface is formed to extend along the inner surface.

According to the above-mentioned structure of the information storage device of the present invention, the device includes the hard disk driving mechanism, the first housing for accommodating the hard disk driving mechanism therein, the second housing for accommodating the first housing therein, and the connector portion, and the first housing is supported by a cushioning material to have a distance between the first housing and the second housing. Since the hard disk driving mechanism is not directly supported but the first housing, which accommodates the hard disk driving mechanism, is supported by the second housing, the hard disk driving mechanism does not receive inappropriate external force. In addition, since the cushioning material has the above-mentioned structure of the present invention, shock can be absorbed by deformation of the projection portion of the cushioning material. It is thus possible to prevent shock on the hard disk driving mechanism accommodated in the first housing.

An information storage device according to another aspect of the present invention is removably mounted on a device body, including a hard disk driving mechanism, a first housing for accommodating the hard disk driving mechanism therein, a second housing for accommodating the first housing therein, and a connector portion, wherein the first housing is supported by a cushioning material to have a distance between the first housing and the second housing, the cushioning material has main body having a space formed therein to come in contact with an outer surface of the first housing for covering at least part of the first housing and has a contact surface formed on an outer surface of the cushioning material to come in contact with an inner surface of the second housing, and the cushioning material has a hole formed in at least part of the contact surface to promote deformation.

According to the above-mentioned structure of the information storage device of the present invention, the device includes the hard disk driving mechanism, the first housing for accommodating the hard disk driving mechanism therein, the second housing for accommodating the first housing therein, and the connector portion, and the first housing is supported by a cushioning material to have a distance between the first housing and the second housing. Since the hard disk driving mechanism is not directly supported but the first housing, which accommodates the hard disk driving mechanism, is supported by the second housing, the hard disk driving mechanism does not receive inappropriate external force. In addition, since the cushioning material has the above-mentioned structure of the present invention, shock can be absorbed by deformation of the cushioning material by means of the hole formed in the contact surface of the cushioning material. It is thus possible to prevent shock on the hard disk driving mechanism accommodated in the first housing.

Therefore, according to the present invention, a so-called detachable information storage device removably mounted on a device body can provide improved resistance to shock.

BRIEF DESCRIPTION OF THE DRAWINGS

FIG. 3A is a perspective view of the mechanism viewed from the side of a top cover, FIG. 3B is a perspective view of the mechanism viewed from the side of a wiring board, and FIG. 3C is a schematic diagram showing the internal structure;

FIG. 18A shows the gasket before the pressing and FIG. 18B shows the gasket being pressed;

FIG. 21A shows the gasket and the packing before the pressing and FIG. 21B shows the gasket and the packing being pressed;

DESCRIPTION OF THE PREFERRED EMBODIMENTS

Figure 1:
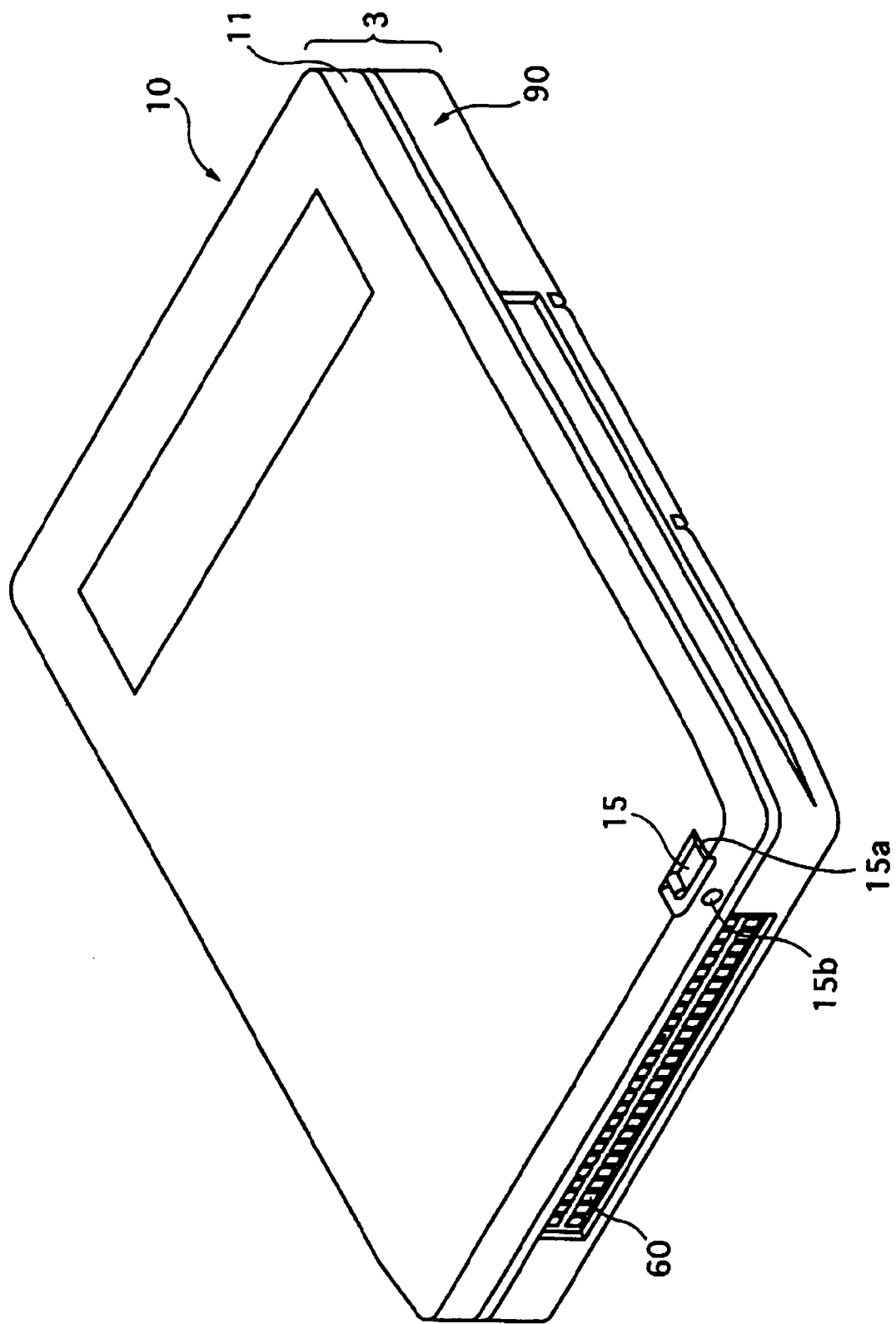
FIG. 1 is a perspective view showing the general structure of an information storage device according to an embodiment of the present invention.

According to an embodiment, the present invention provides a cushioning material for supporting an inner first housing and an outer second housing to have a distance between the first and second housings, the cushioning material has a main body having a space therein to come in contact with an outer surface of the first housing for covering at least part of the first housing, and at least one projection portion formed to protrude from the main body toward the second housing, the projection having a contact surface to come in contact with an inner surface of the second housing, the contact surface being formed to extend along the inner surface.

According to an embodiment of the present invention, in the cushioning material, the projection portion is provided on each of an upper surface, a lower surface, and side surfaces of the main body.

According to an embodiment, the present invention provides a cushioning material for supporting an inner first housing and an outer second housing to have a distance between the first and second housings, the cushioning material has a space to come in contact with an outer surface of the first housing for covering at least part of the first housing, a contact surface formed on an outer surface of the cushioning material to come in contact with an inner surface of the second housing, and a hole formed in at least part of the contact surface to promote deformation.

According to an embodiment of the present invention, in the cushioning material, the hole is formed to penetrate to the space.

According to an embodiment, the present invention provides an information storage device removably mounted on a device body, including a hard disk driving mechanism, a first housing for accommodating the hard disk driving mechanism therein, a second housing for accommodating the first housing therein, and a connector portion, wherein the first housing is supported by a cushioning material to have a distance between the first housing and the second housing, the cushioning material has a main body having a space formed therein to come in contact with an outer surface of the first housing for covering at least part of the first housing, and has at least one projection portion formed to protrude from the main body toward the second housing, and the projection has a contact surface to come in contact with an inner surface of the second housing, the contact surface being formed to extend along the inner surface.

According to an embodiment of the present invention, in the information storage device, the projection portion is provided on each of an upper surface, a lower surface, and side surfaces of the main body of the cushioning material.

According to an embodiment, the present invention provides an information storage device removably mounted on a device body, including a hard disk driving mechanism, a first housing for accommodating the hard disk driving mechanism therein, a second housing for accommodating the first housing therein, and a connector portion, wherein the first housing is supported by a cushioning material to have a distance between the first housing and the second housing, the cushioning material has a main body having a space formed therein to come in contact with an outer surface of the first housing for covering at least part of the first housing, and has a contact surface formed on an outer surface of the cushioning material to come in contact with an inner surface of the second housing, and the cushioning material has a hole formed in at least part of the contact surface to promote deformation.

According to an embodiment of the present invention, in the information storage device, the hole is formed to penetrate to the space.

Figure 2:
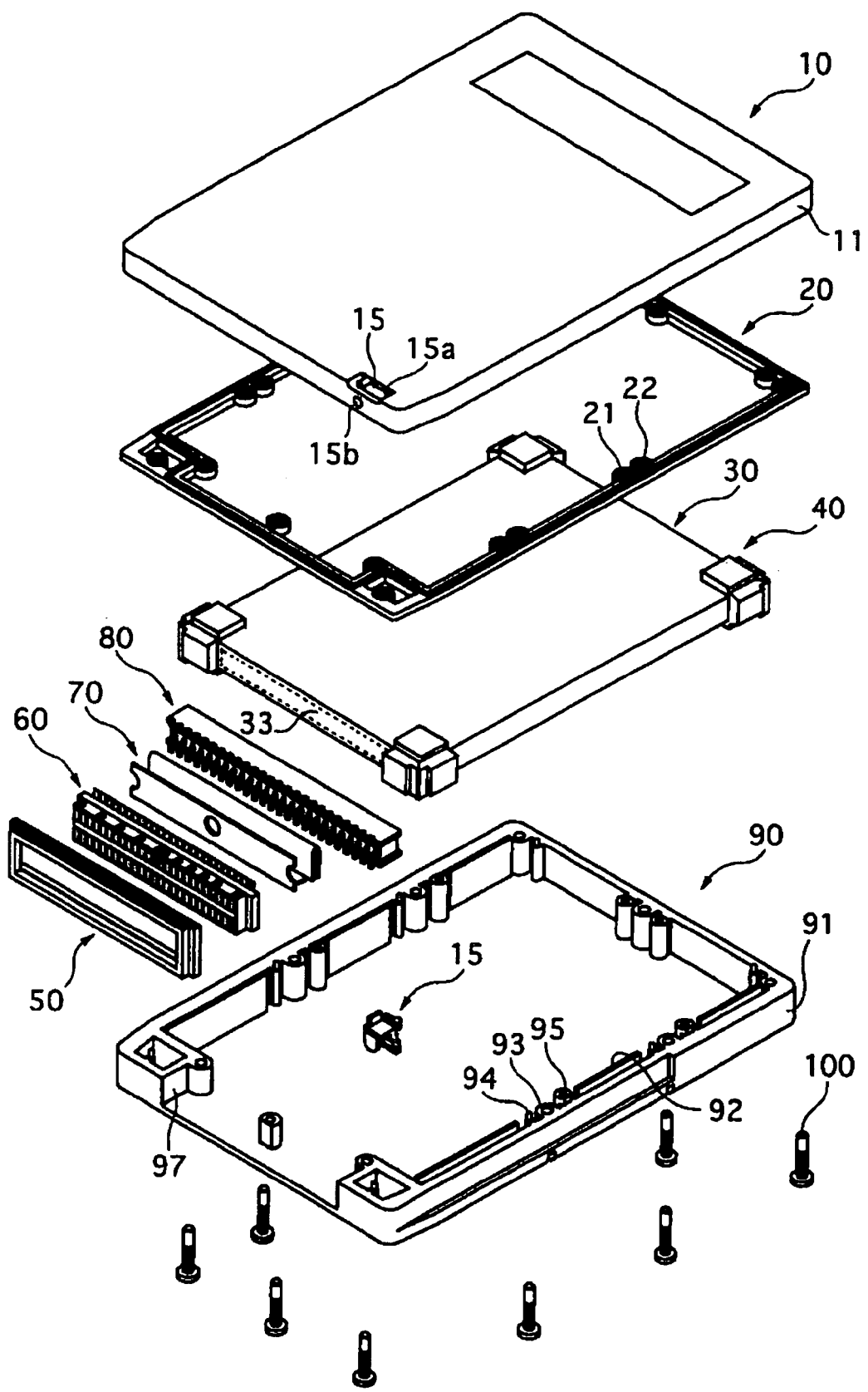
FIG. 2 is an exploded perspective view of the information storage device in FIG. 1.

FIG. 1 shows the general structure of an information storage device to which the present invention is applied as an embodiment of the present invention. FIG. 1 is a perspective view showing an assembled information storage device 1, while FIG. 2 is an exploded perspective view of the device. As shown in FIGS. 1 and 2, the information storage device 1 has a hard disk driving mechanism 30, a housing 3 for accommodating the hard disk driving mechanism 30, and a connector 60. The information storage device 1 is a detachable type information storage device which is removably connected by the connector 60 directly to a personal computer, a video camera or the like (in the following description, an electronic device to which the information storage device 1 is connected is simply referred to as "a device body") without a cable or the like used between them and carried for use in various locations, as an extension device for increasing capacity or a recording medium for recording data or programs such as a large amount of image or video.

The housing 3 for accommodating the hard disk driving mechanism 30 includes an upper half part 10 and a lower half part 90. The connector 60 for outputting and inputting signals to and from the device body and receiving power supply is attached to face one side of the housing 3. A slidable write protect tab 15 is provided in a window 15a formed in the upper half part 10. A window 15b is provided in the side of the upper half part 10 forming the one side of the information storage device 1 which the connector 60 faces. When the information storage device 1 is inserted into the device body, the write protect tab 15 seen from the window 15b indicates to the device body whether or not data can be written to the information storage device 1. A user can slide and switch the write protect tab 15 in the window 15a to set whether or not data can be written to the information storage device 1 by himself/herself.

Each of the upper half part 10 and the lower half part 90 is made, for example of metal or a synthetic resin such as fiber reinforced plastic. As shown in FIG. 2, in this embodiment, a side wall is cut on a shorter side of the lower half part 90 to form an opening 97 into which the connector 60 is attached. Connected to the connector 60 is a connector pin 33 of the hard disk driving mechanism 30 through a junction flexible printed circuit (hereinafter referred to as the "junction FPC") 70 which has power lines or signal lines formed thereon. In the information storage device 1, the connector 60 is directly connected to connection terminals of the device body to serve as an interface for power supply from the device body and signal transmission and reception to and from the device body such that driving power is supplied to and signals are transmitted and received to and from the hard disk driving mechanism 30 in the housing 3.

Figure 3A:
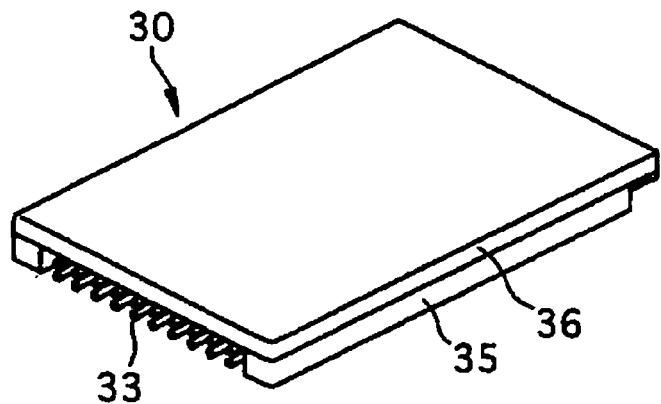
FIGS. 3A to 3C show the structure of a hard disk driving mechanism of the information storage device in FIG. 1, and specifically.
Figure 3B:
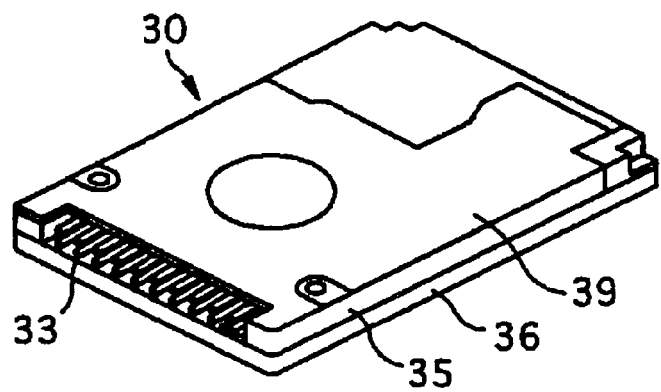
Figure 3C:
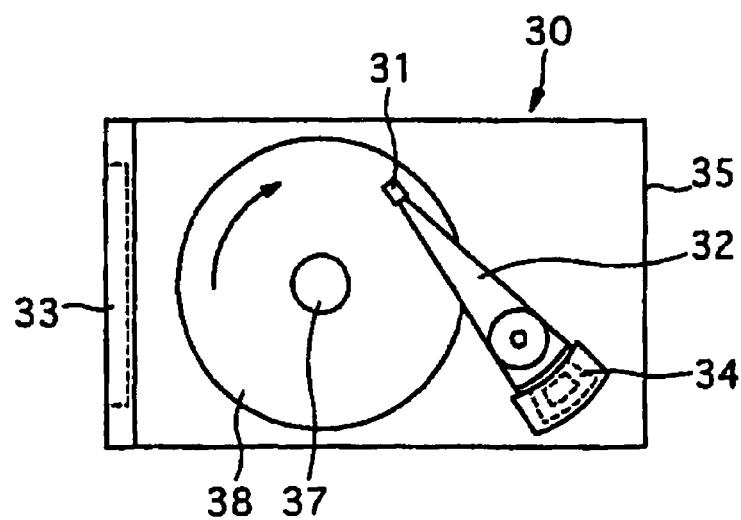

The hard disk driving mechanism 30 has a magnetic disk 38 mounted to a rotation spindle 37 and an actuator 34 for head positioning as shown in FIG. 3C, in space defined by a chassis 35 and a top cover 36 shown in FIGS. 3A and 3B. The actuator 34 for head positioning supports a magnetic head 31 for recording and reproducing information to and from the magnetic disk 38 through a head arm 32. The hard disk driving mechanism 30 is provided with a wiring board 39 having electronic circuits thereon for controlling drive of the above-mentioned respective parts and recording/reproduction to and from the magnetic disk 37 on the back of the chassis 35. The connector pin 33 is attached to the wring board 39 on one side of the chassis 35 for outputting/inputting signals for recording/reproduction to and from the magnetic head 31 and for connecting the driving power to a spindle motor (not shown), the actuator 34 and the like.

As shown in FIG. 2, cushioning materials 40 for shock absorption are disposed between the hard disk driving mechanism 30 and the housing 3 for protecting the hard disk driving mechanism 30 within the housing 3 from vibration or shock from the outside. The cushioning materials 40 are disposed, for example, at four corners of the hard disk driving mechanism 30 to absorb shock and vibration from the outside when the hard disk driving mechanism 30 is accommodated in the housing 3, thereby preventing breakage of the hard disk driving mechanism 30 due to shock, and maintaining normal driving. Each of the cushioning materials 40 is formed by molding an elastic member in a predetermined shape. As a material for forming the elastic member, rubber with elasticity or a viscoelastic body such as a gel material can be used. As the rubber, various types of rubber can be used, for example, natural rubber (NR), isoprene rubber (IR), styrene-butadiene rubber (SBR), isobutylene-isoprene rubber (IIR), butadiene rubber (BR), nitrile rubber (NBR), silicone rubber, and fluororubber. More specific examples include Hanenaito (trade name) manufactured by Naigai Rubber Industry Co., Ltd. and Poron (trade name) manufactured by Inoac Corporation. On the other hand, as the gel material, a gel material predominantly made of silicone such as silicone gel can be used. More specific examples include α gel, β gel, and θ gel (trade names) manufactured by Geltec Co., Ltd.

Figure 5:
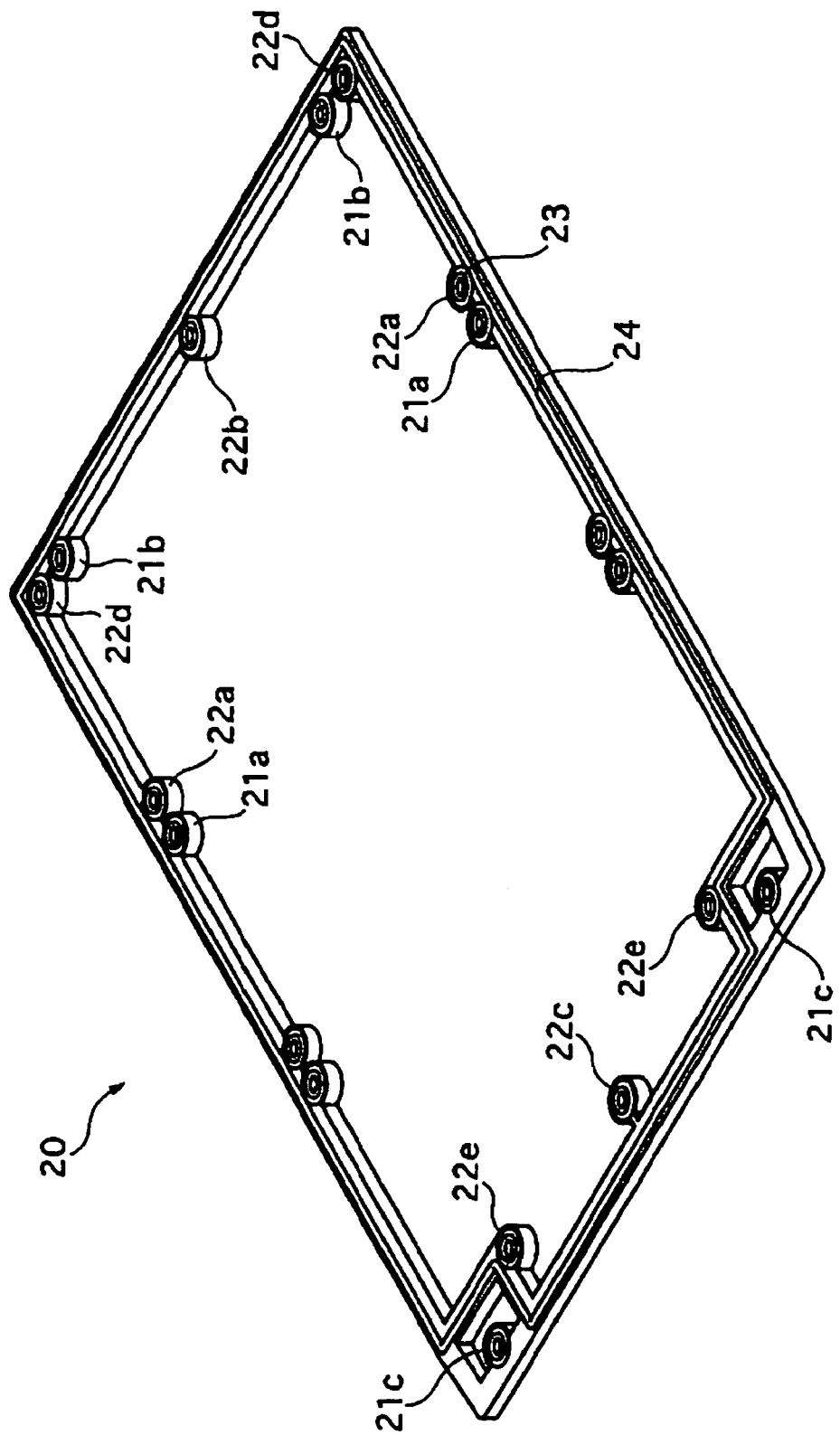
FIG. 5 is a perspective view of a gasket of the information storage device in FIG. 1.

In addition, as shown in FIGS. 2 and 5, the information storage device 1 has a gasket 20 sandwiched between the upper half part 10 and the lower half part 90. The gasket 20 is provided with projections 21a, 21b, and 21c for positioning, and projections 22a, 22b, 22c, 22d, and 22e having holes formed therein through which screws are inserted when the device is assembled. The gasket 20 is a housing sealing member formed along the periphery of the housing to fill the gap between the upper half part 10 and the lower half part 90 to enhance hermeticity of the housing 3 when the information storage device 1 is assembled.

As shown in FIG. 5, the projections 21a, 21b, and 21c formed to protrude inside the gasket 20 as a substantially rectangular frame have holes formed therein for inserting positioning pins to facilitate positioning when the gasket 20 is mounted on the lower half part 90. The projections 22a, 22b, 22c, 22d, and 22e having the holes for inserting screws 100 are put on bosses having screw holes of the lower half part 90 when the gasket 20 is mounted on the lower half part 90. Lips 23 are formed along the respective peripheries of the projections 22a, 22b, 22c, 22d, and 22e on the surfaces of the projections 22a, 22b, 22c, 22d, and 22e abutting on respective side walls 11 and 91 of the upper half part 10 and the lower half part 90 to enhance hermeticity around the rim of the holes formed in the projections 22a, 22b, 22c, 22d, and 22e. On the surface of the gasket 20, a lip 24 having a substantially semicircular cross section as a projective line is formed to protrude from the surface of the gasket 20 and to extend along the shape of the gasket 20. The gasket 20 is formed with a material with high hermeticity and elasticity, for example fluororubber and ethylene-propylene-diene rubber.

Figure 6:
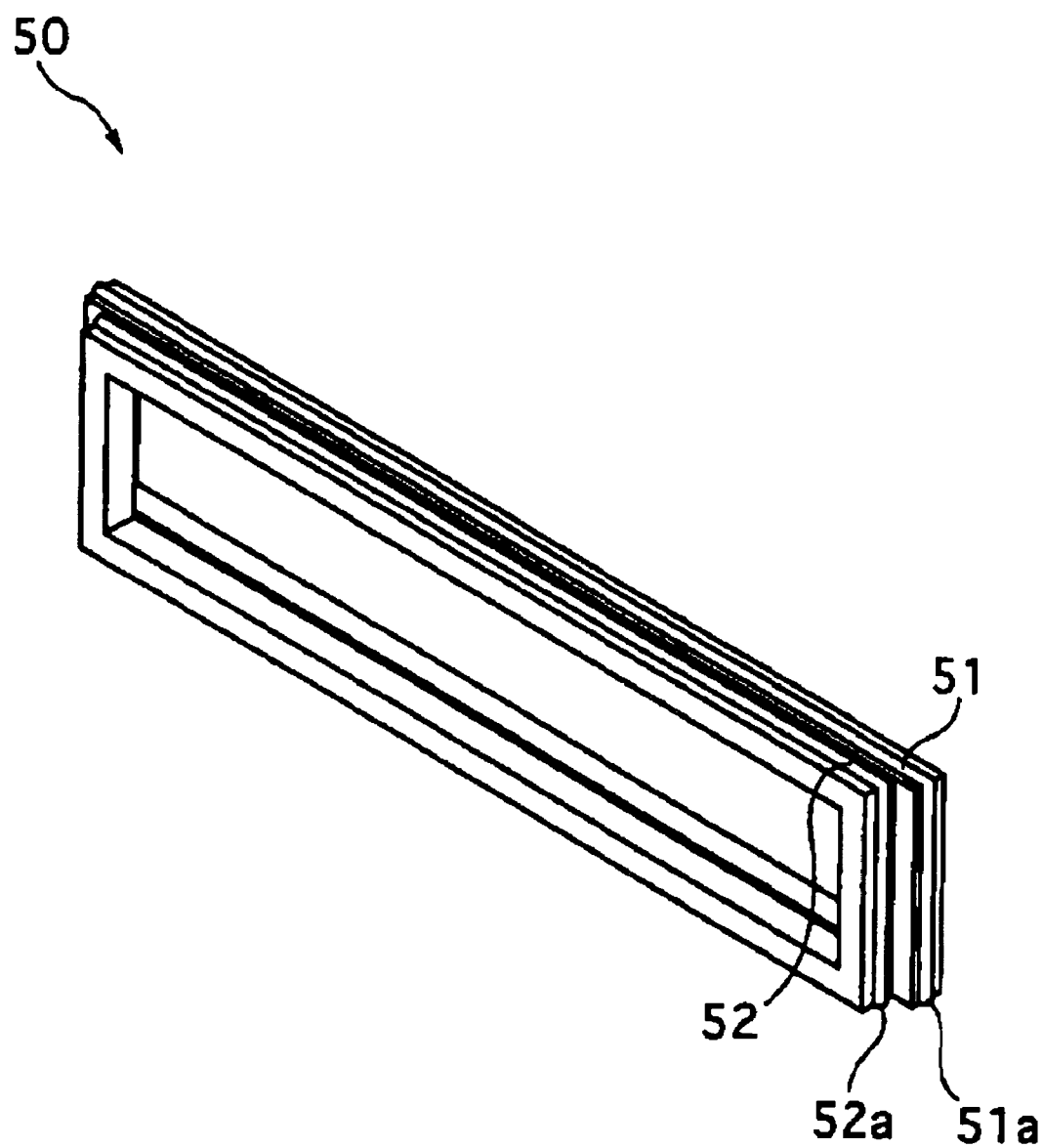
FIG. 6 is a perspective view of a packing of the information storage device in FIG. 1.

As shown in FIGS. 2 and 6, the information storage device 1 has a packing 50 disposed to enhance hermeticity on the periphery of the connector 60. The packing 50 is a connector sealing member into which the connector 60 fits.

The packing 50 is sandwiched between the gasket 20 and the connector 60 and between the connector 60 and the lower half part 90 to increase hermeticity of the housing 3. The connector 60 is electrically connected to the connector pin 33 through the junction FPC 70 and an IDE socket 80 to output and input recording/reproduction signals to and from the hard disk driving mechanism 30 and supply power.

As shown in FIG. 6, lips 51 and 52 are formed on the outer periphery of the packing 50. The lips 51 and 52 extend along the periphery of the packing 50 as a frame. The lips 51 and 52 are formed at positions where they and the lip 24 formed in gasket 20 do not overlap each other on the outer periphery of the packing 50 when the packing 50 abuts on the gasket 20 in assembling the information storage device 1. The lip 24 formed in the gasket 20 is contacted and pressed between the lips 51 and 52 formed in the packing 50 to enhance hermeticity between the gasket 20 and the packing 50. Three or more lips may be formed in the packing 50, and these lips may be formed at regular intervals on the surface of the periphery of the packing 50. The packing 50 may abut on and be pressed against the gasket 20 with the lips formed in the packing 50 and the lips formed in the gasket 20, which are located not to overlap each other, to further increase hermeticity of the housing 3. In addition, lips 51a and 52a are formed on the sides of the packing 50. The lips 51a and 52a are pressed against the opening 97 formed in the half part 90, as later described, to enhance hermeticity of the side of the connector 60. The packing 50 can be formed of a material with high hermeticity and elasticity such as fluororubber and ethylene-propylene-diene rubber, similarly to the gasket 20.

Figure 7:
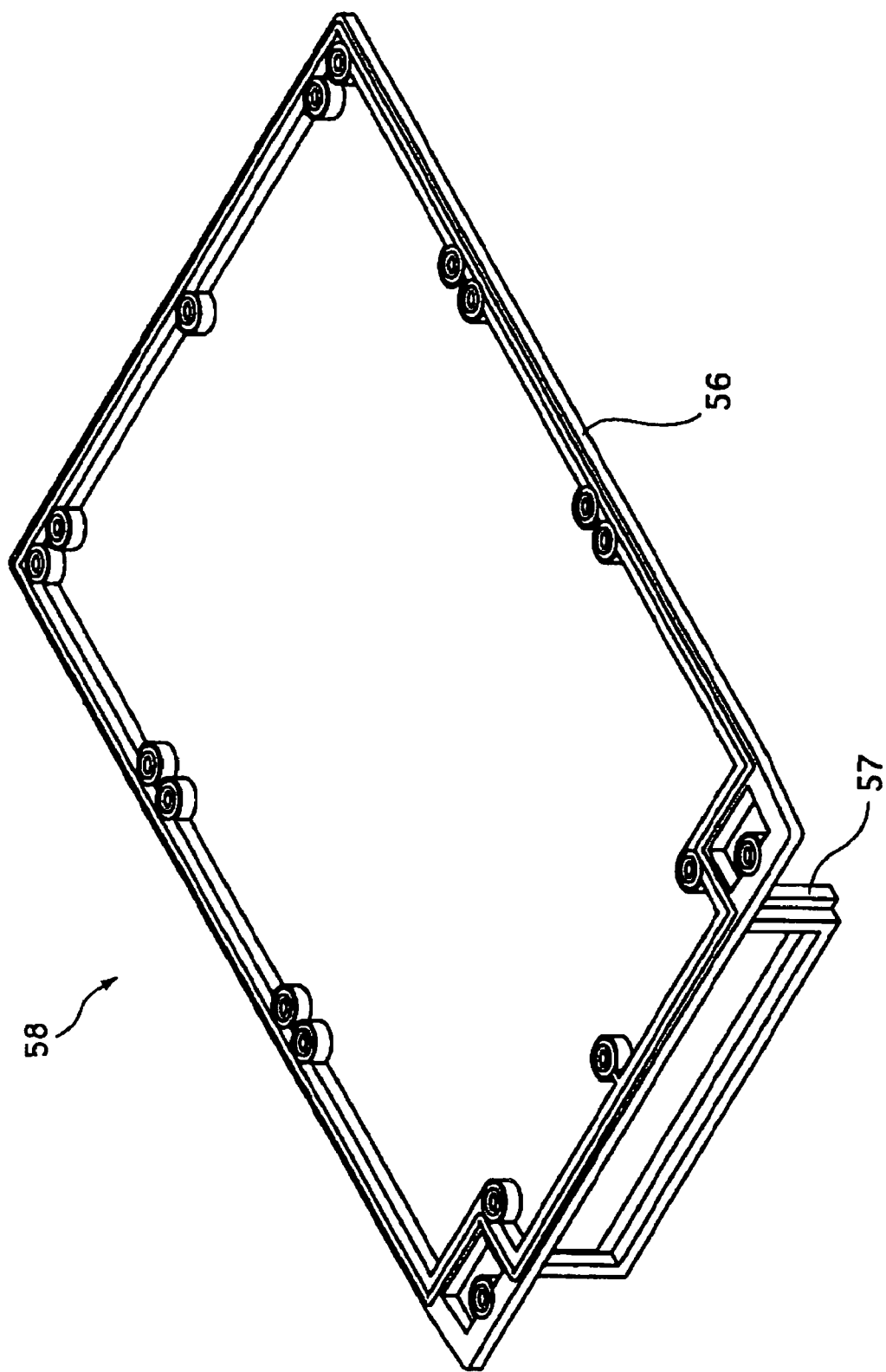
FIG. 7 is a perspective view showing a gasket and a packing in integral form.

In addition to the configuration in which the gasket 20 is formed separately from the packing 50 as in this embodiment, a sealing member 58 may be used by previously forming a gasket 56 and a packing 57 as an integral component as shown in FIG. 7. In the configuration shown in FIG. 7, hermeticity can be enhanced between the gasket 56 and the packing 57 as compared with the case where the gasket and the packing are formed separately and then they abut each other. Also, a reduced number of part scan lead to a reduction in cost of the information storage device 1.

Figure 13:
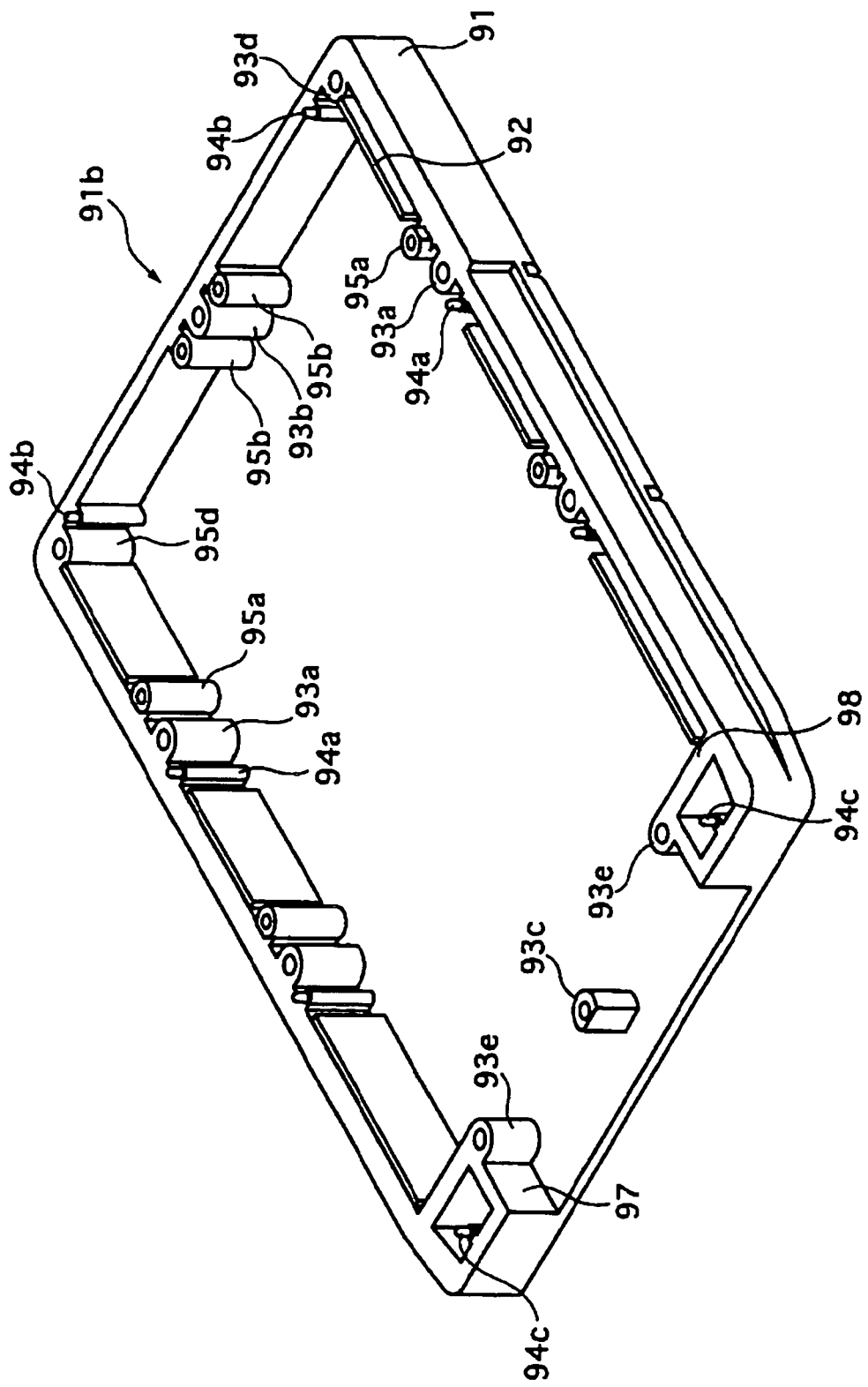
FIG. 13 is a perspective view showing the structure of a lower half part of the information storage device in FIG. 1.
Figure 14:
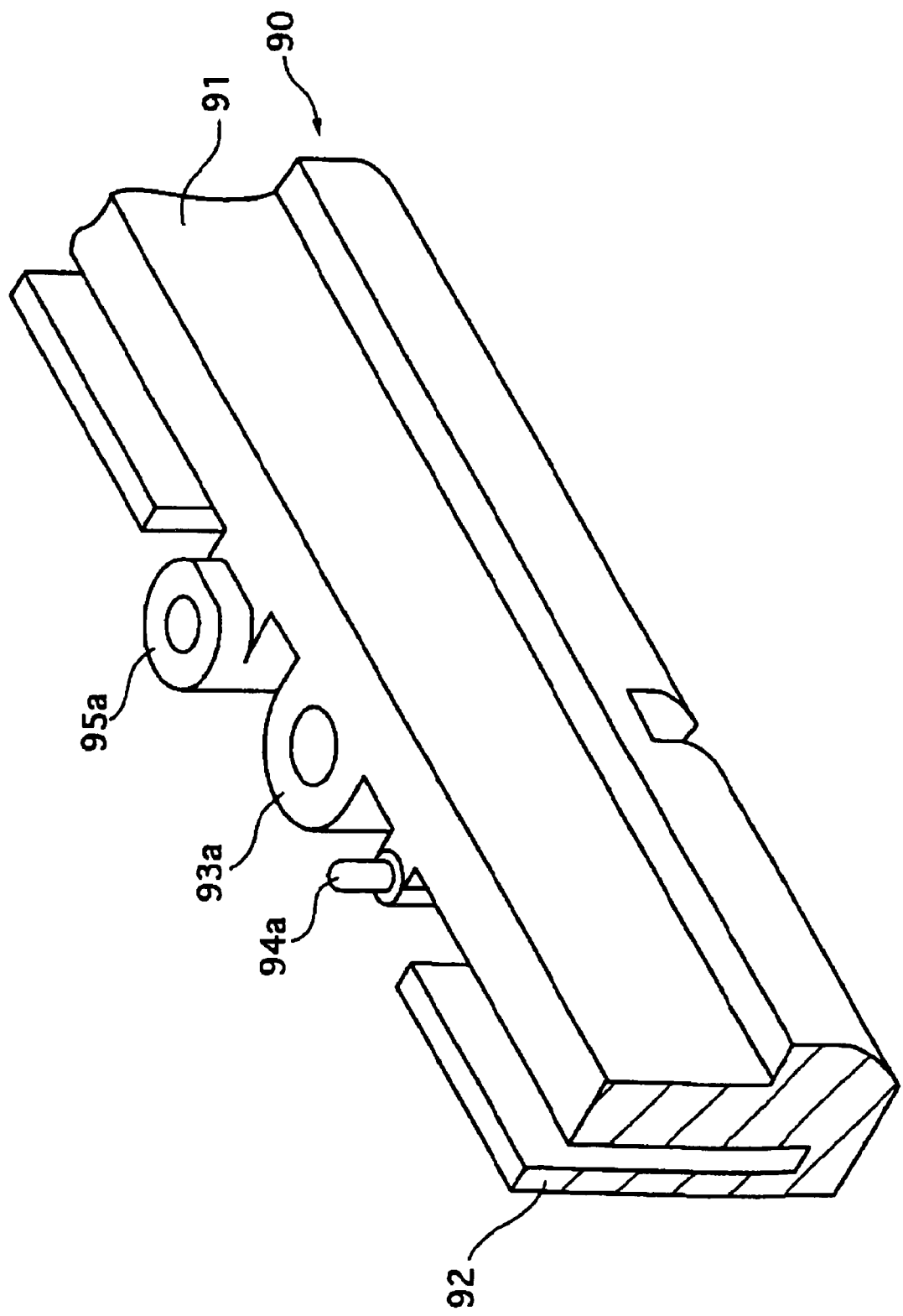
FIG. 14 is an enlarged perspective view of a portion of the lower half part near a boss of the information storage device in FIG. 1.

As shown in FIGS. 2, 13, and 14, the lower half part 90 constituting part of the information storage device 1 has the sidewall 91 as its periphery, a protection wall 92 provided to extend inside the side wall 91, bosses 93a, 93b, 93c, 93d, and 93e having screw holes formed therein, positioning pins 94a, 94b, and 94c, and stoppers 95a and 95b.

As shown in FIG. 2, the protection wall 92 formed inside the side wall 91 of the lower half part 90 prevents the gasket 20 from being deformed and entering the housing 3 when the gasket 20 is pressed and sandwiched between the upper half part 10 and the lower half part 90.

The stoppers 95a and 95b are formed along the side wall 91 of the lower half part 90. Similar stoppers (not shown) are formed inside the side wall 11 which is the periphery of the upper half part 10. When the information storage device 1 is assembled, the stoppers formed in the upper half part 10 abut on the stopper formed in the lower half part 90 to prevent the gasket 20 from being pressed excessively by the upper half part 10 and the lower half part 90. Thus, the thickness of the gasket 20 can be regulated substantially uniformly over the entire housing 3. This can enhance hermeticity of the whole housing 3.

Each of the bosses 93a, 93b, 93c, 93d, and 93e has a screw hole into which each screw 100 is inserted to secure the upper half part 10 and the lower half part 90, thus the housing 3 is formed. The boss 93c of the bosses in an area adjacent to the opening 97 can serve as a support for supporting the connector 60 from the back.

The positioning pins 94a, 94b, and 94c prevent displacements caused when the upper half part 10, the lower half part 90, and the gasket 20 are disposed one on another in forming the housing 3. The gasket 20 has positioning holes provided in the projections 21a, 21b, and 21c formed in alignment with the positioning pins 94a, 94b, and 94c. The positioning pins 94a, 94b, and 94c are inserted into the positioning holes to position the gasket 20. In addition, positioning holes into which the positioning pins are inserted are also formed in the upper half part 10 to allow more accurate positioning in the whole housing 3.

Description is made in more detail with reference to FIG. 13. The bosses 93a, 93b, 93c, 93d, and 93e are formed inside the side wall 91 of the lower half part 90. When the upper half part 10 is secured to the lower half part 90 by screws with the gasket 20 interposed between them, screw holes formed in the bosses 93a, 93b, 93c, 93d, and 93e are in line with screw holes of bosses formed in the upper half part 10 to allow screws to be inserted thereinto. Since the gasket 20 also has the holes into which the screws are inserted, the gasket 20 is secured to the upper half part 10 and the lower half part 90. When the upper half part 10 is secured to the lower half part 90, the stoppers 95a and 95b abut on the stoppers formed in the upper half part 10 to suppress excessive pressing of the gasket 20 by the upper half part 10 and the lower half part 90. When the gasket 20 is mounted on the lower half part 90, the positioning pins 94a, 94b, and 94c are inserted into the positioning holes formed in the projections 21a, 21b, and 21c of the gasket 20 to adjust the position for the gasket 20. Especially when the gasket 20 is formed of a member having elasticity such as rubber, positioning is not stably achieved. However the positioning is performed with the positioning pins 94a, 94b, and 94c to mount not only the gasket 20 but also the upper half part 10 above the side wall 91 of the lower half part 90 with almost no displacement. The stoppers 95b are provided on both sides of the boss 93b inside the side wall 91b on the opposite side to the opening 97 in which the connector 60 is disposed, excessive pressing of the gasket 20 by the upper half part 10 and the lower half part 90 is also suppressed on the side wall 91b of the shorter side of the side wall 91 on the periphery of the lower half part 90.

FIG. 14 is an enlarged view of a portion of the side wall 91 of the lower half part 90 to describe the structures of the boss 93a, the stopper 95a, and the positioning pin 94a formed inside the side wall 91 in more detail. The boss 93a is formed to have substantially the same height as the side wall 91, and the top surface of the boss 93a and the top surface of the side wall 91 form a substantially continuous flat surface. Thus, when the gasket 20 is placed on the top surface of the side wall 91, the gasket 20 can be disposed on the surface with almost no projection and depression. The stopper 95a is provided for the purpose of preventing variations in thickness of the gasket 20 due to a screw tightened too much and the like. Since the top surface of the stopper 95a is formed at a position higher than that of the top surface of the side wall 91, a certain thickness of the gasket 20 can be ensured when the gasket 20 is pressed by the upper half part 10 and the lower half part 90, thereby preventing the gasket 20 from being pressed excessively. The positioning pin 94a is formed to have its top extending higher than the top surface of the side wall 91 similarly to the stopper 95a. Since the boss 93a having the screw hole, the stopper 95a, and the positioning pin 94a are adjacent to each other and close to the side wall 91, the information storage device 1 can be assembled while displacements of the upper half part 10, the gasket 20, and the lower half part 90, and variations in thickness of the gasket 20 are effectively prevented.

The protection wall 92 is formed inside the side wall 91 to extend along the side wall 91. The protection wall 92 is a deviation preventing wall provided for preventing the deformed gasket 20 from entering the housing 3 when the gasket 20 is pressed and sandwiched between the upper half part 10 and the lower half part 90. The protection wall 92 prevents poor hermeticity of the housing 3 which would occur due to the gasket 20 entering the housing 3. In FIG. 13, a protection wall may also be formed inside the side wall 91b.

Figure 8:
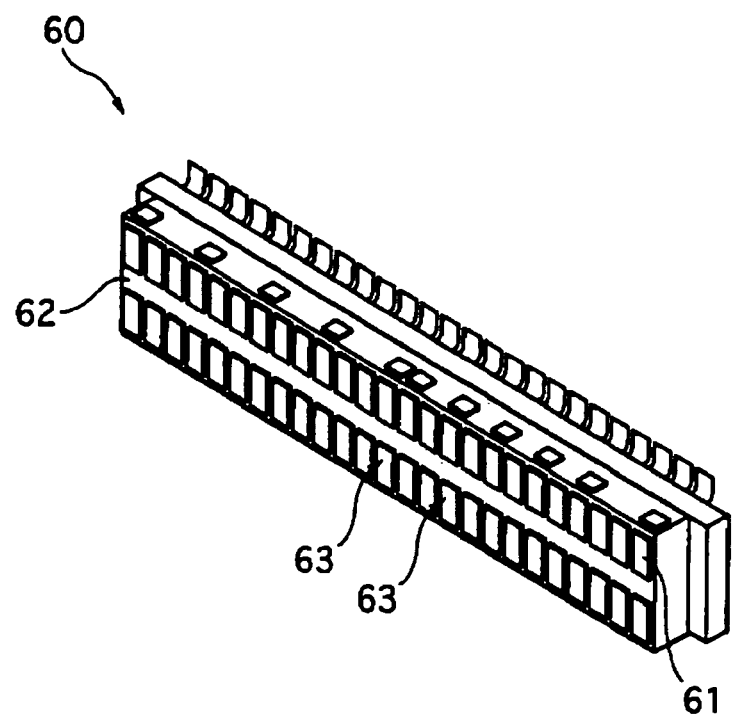
FIG. 8 is a perspective view of a connector of the information storage device in FIG. 1.

As shown in FIGS. 2 and 8, the connector 60 is formed to have connector terminals 61 embedded in a resin. The surfaces of the connector terminals 61 to come in contact with terminals provided for the device body are arranged in upper and lower lines on the surface of the connector 60 facing the device body. A resin portion 62 is a filled resin between these connector terminals 61 disposed in the upper and lower lines on the surface facing the device body. The surface of the connector terminals 61 and the surface of the resin portion 62 form a continuous and substantially flat surface. When the information storage device 1 is inserted into the device body, the terminals of the device body abut on a contact surface 63 of the connector terminals 61 facing the device body to input and output signals and supply power. The connector terminals 61 are led out from the back of the connector 60 for transmitting output and input signals to and from, and for supplying power to the hard disk driving mechanism 30.

Figure 9:
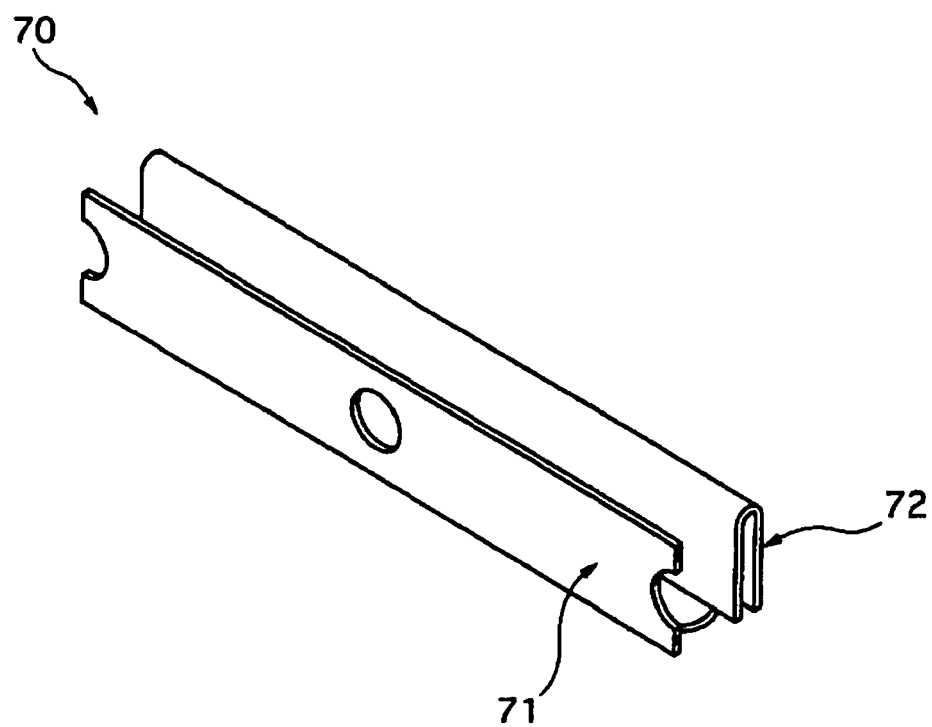
FIG. 9 is a perspective view of a junction FPC of the information storage device in FIG. 1.

As shown in FIGS. 2 and 9, the junction FPC 70 electrically connects the IDE socket 80 to the connector 60 to transmit signals. A surface 71 facing the connecter terminals and a surface 72 facing socket-side terminals are substantially flat. These surfaces 71 and 72 abut on the connector terminals and the socket-side terminals to make electrical connection.

Figure 10:
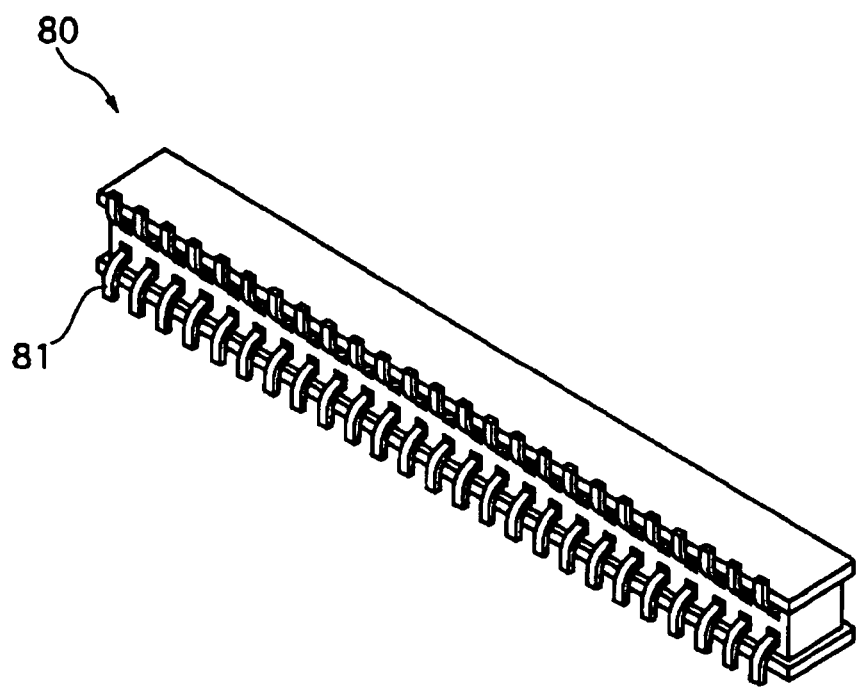
FIG. 10 is a perspective view of an IDE socket of the information storage device in FIG. 1.

As shown in FIGS. 2 and 10, the IDE socket 80 is electrically connected to the junction FPC 70, and also electrically connected to the connector pin 33 formed in the hard disk driving mechanism 30 by fitting the connector pin 33 into the IDE socket 80. The side of the IDE socket 80 facing the junction FPC has socket-side terminals 81 led out therefrom which abut on the surface 72 on the back of the junction FPC 70 to make electrical connection.

Figure 11:
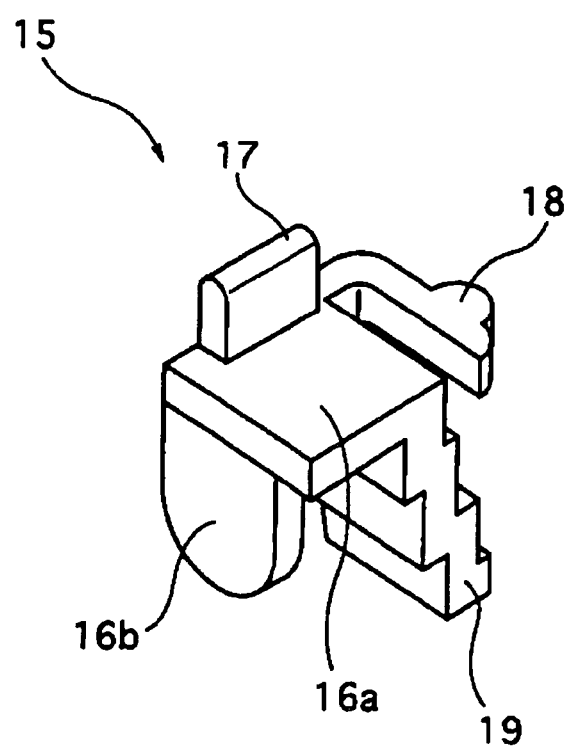
FIG. 11 is a perspective view of a write protect tab of the information storage device in FIG. 1.

As shown in FIGS. 2 and 11, the write protect tab 15 has an elastic cantilever 18 for providing a user with a clicking feeling for a signal of positioning when it is slid. A rib 19 is formed under the elastic cantilever 18 for stable sliding when the write protect tab 15 is slid. The write protect tab 15 also has a tab 17 for a user to pinch when the user slides the write protect tab 15, and a display surface 16b for the device body to check whether or not data can be written to the hard disk driving mechanism 30. As the write protect tab 15 is slid, the display surface 16b is seen from the device body through the window 15b formed in the upper half part 10 to allow the device body to detect whether or not data can be written. The write protect tab 15 has a display surface 16a for allowing a user to view the display surface 16a from the window 15a. Thus, the user can check whether or not data can be written to the information storage device 1 by direct viewing.

Figure 12:
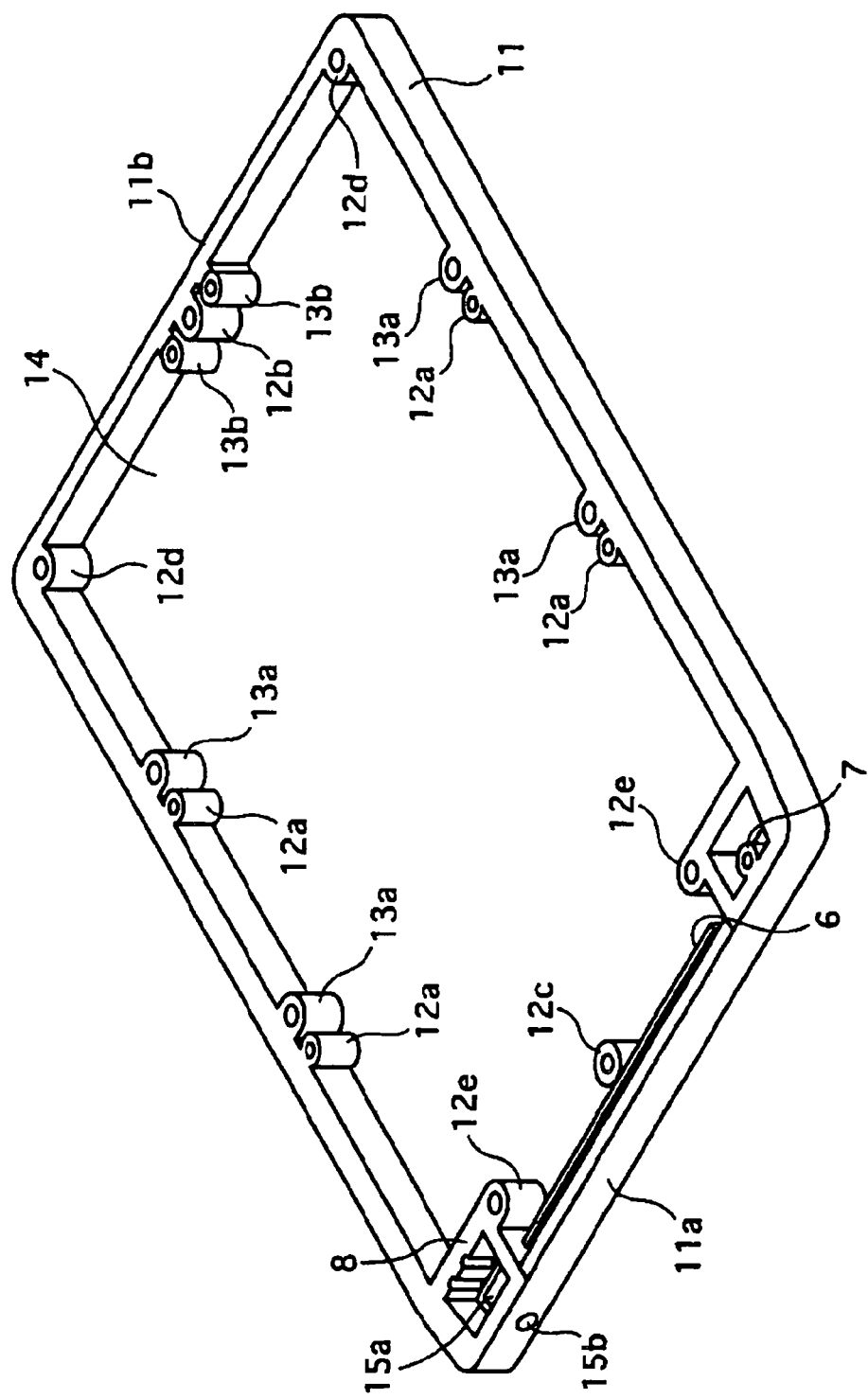
FIG. 12 is a perspective view showing the structure of an upper half part of the information storage device in FIG. 1.

Next, as shown in FIGS. 2 and 12, bosses 12a, 12b, 12c, 12d, and 12e having screw holes formed therein are provided inside the side wall 11 which is the periphery of the upper half part 10. Stoppers 13a and 13b formed to be adjacent to the bosses 12a and 12b, respectively, can suppress excessive pressing of the gasket 20 by the upper half part 10 and the lower half part 90, and maintain the thickness of the gasket 20 to be substantially uniform over the entire housing 3 when it is pressed.

The bosses 12b and 12c having screw holes formed therein are formed on the side walls 11a and 11b serving as shorter sides of the periphery of the upper half part 10. The side wall 11a is the periphery located above the connector 60 when the information storage device 1 assembled. The bosses 12c and 12e are formed in an area extending from the side wall 11a toward the inside of the upper half part 10. The boss 12c is formed at substantially the center in the longitudinal direction of the side wall 11a. The bosses 12e are formed at positions symmetric about the central line of a bottom surface 14 along the side wall 11. The bosses 12b and 12d, and the stoppers 13b are formed inside the side wall 11b forming part of the periphery of the upper half part 10 and located in opposition to the side wall 11a. The stoppers 13b formed on both sides of the boss 12b suppress excessive pressing of the gasket 20 by the upper half part 10 and the lower half part 90. The bosses 12d are formed at both ends along the side wall 11b.

A protection wall 6 for preventing the gasket 20 and the packing 50 from entering the housing 3 is provided to extend along the longitudinal direction of the side wall 11a inside the side wall 11a located above the connector 60 of the side wall 11 constituting the periphery of the upper half part 10. A boss 7, into which the positioning pin formed in the lower half part 90 is inserted, is formed at one end of the side wall 11a. At the other end of the side wall 11a, a division wall 8 is formed to define non-hermetic space for disposing the write protect tab 15, and separates the non-hermetic space from hermetic space formed when the information storage device 1 is assembled. The window 15a is formed at the bottom of the non-hermetic space in which the write protect tab 15 is disposed such that the write protect tab 15 is slid with the tab 17 protruding from the window 15a. The window 15b open to the outside is formed in the side wall 11a. The display surface 16b of the write protect tab 15 seen from the window 15b is provided for allowing the device body to detect whether or not data can be written to the hard disk driving mechanism 30.

Figure 15:
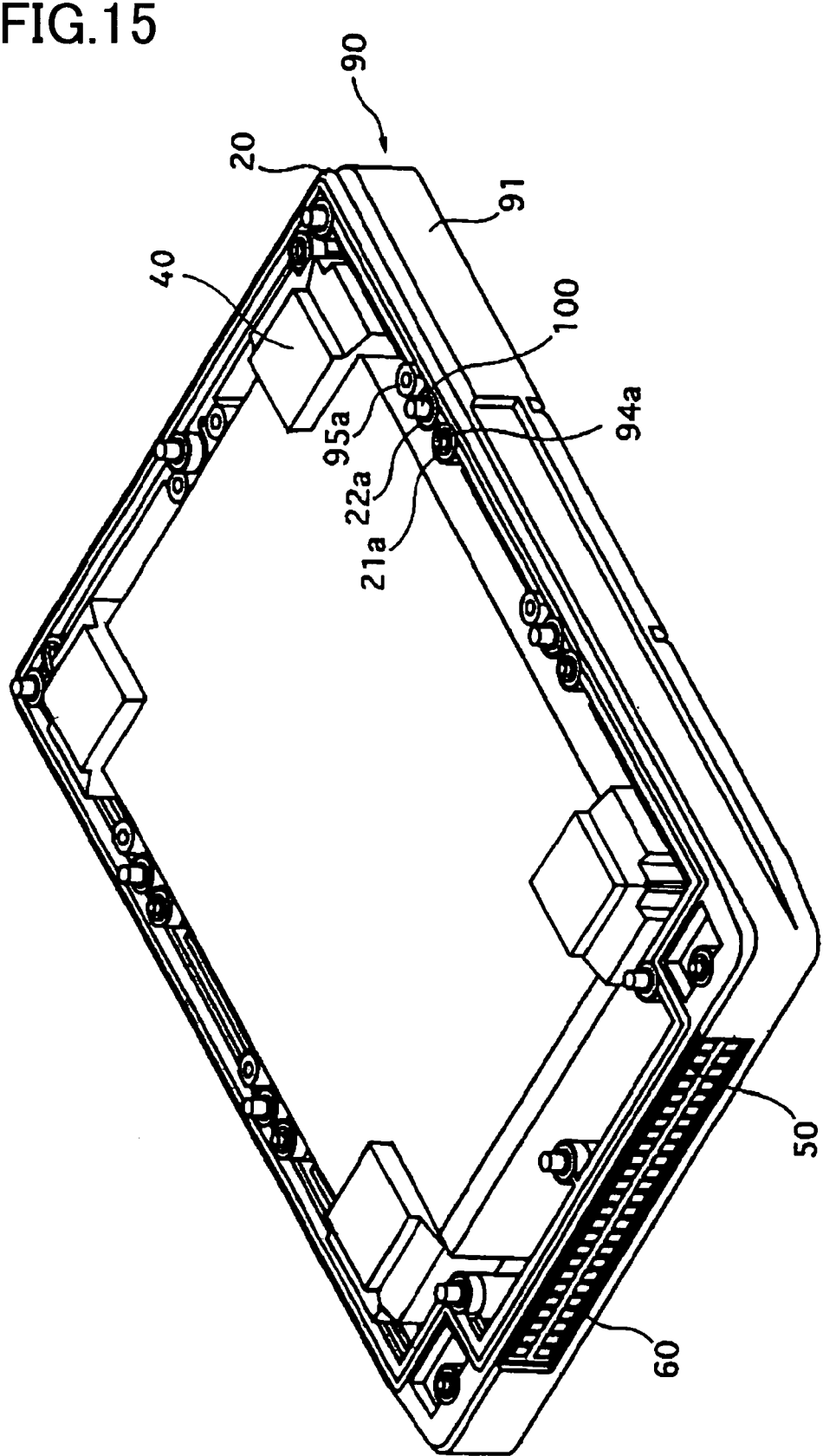
FIG. 15 is a perspective view showing the structure of the information storage device in FIG. 1 from which the upper half part is removed.

Next, FIG. 15 shows the internal structure of the housing 3 from which the upper half part 10 of the information storage device 1 in FIG. 1 is removed and in which the hard disk driving mechanism 30 is accommodated. In FIG. 15, the junction FPC 70, the IDE socket 80 and the like are not shown. The gasket 20 is mounted on the top surface of the side wall 91 of the lower half part 90 such that the gasket 20 is positioned by inserting the positioning pin 94a formed on the lower half part 90 into the positioning hole of the projection 21a provided in the gasket 20. The projection 22a of the gasket 20 is disposed to be located on the boss 93a formed in the lower half part 90, and the screw hole formed in the boss 93a is in line with the hole formed in the projection 22a to allow the screw to be inserted thereinto. When the information storage device 1 is assembled, the screw is also inserted into the screw hole of the boss 12a formed in the upper half part 10 to secure the upper half part 10, the gasket 20, and the lower half part 90 to assemble the information storage device 1. The connector 60 is disposed in the opening 97 of the lower half part 90 with its periphery surrounded by the packing 50. When the information storage device 1 is assembled, the gasket 20 is disposed to abut on the top surface of the packing 50, and the packing 50 into which the connector 60 fits is sandwiched between the gasket 20 and the lower half part 90 to seal the connector 60 on the periphery.

Figure 16:
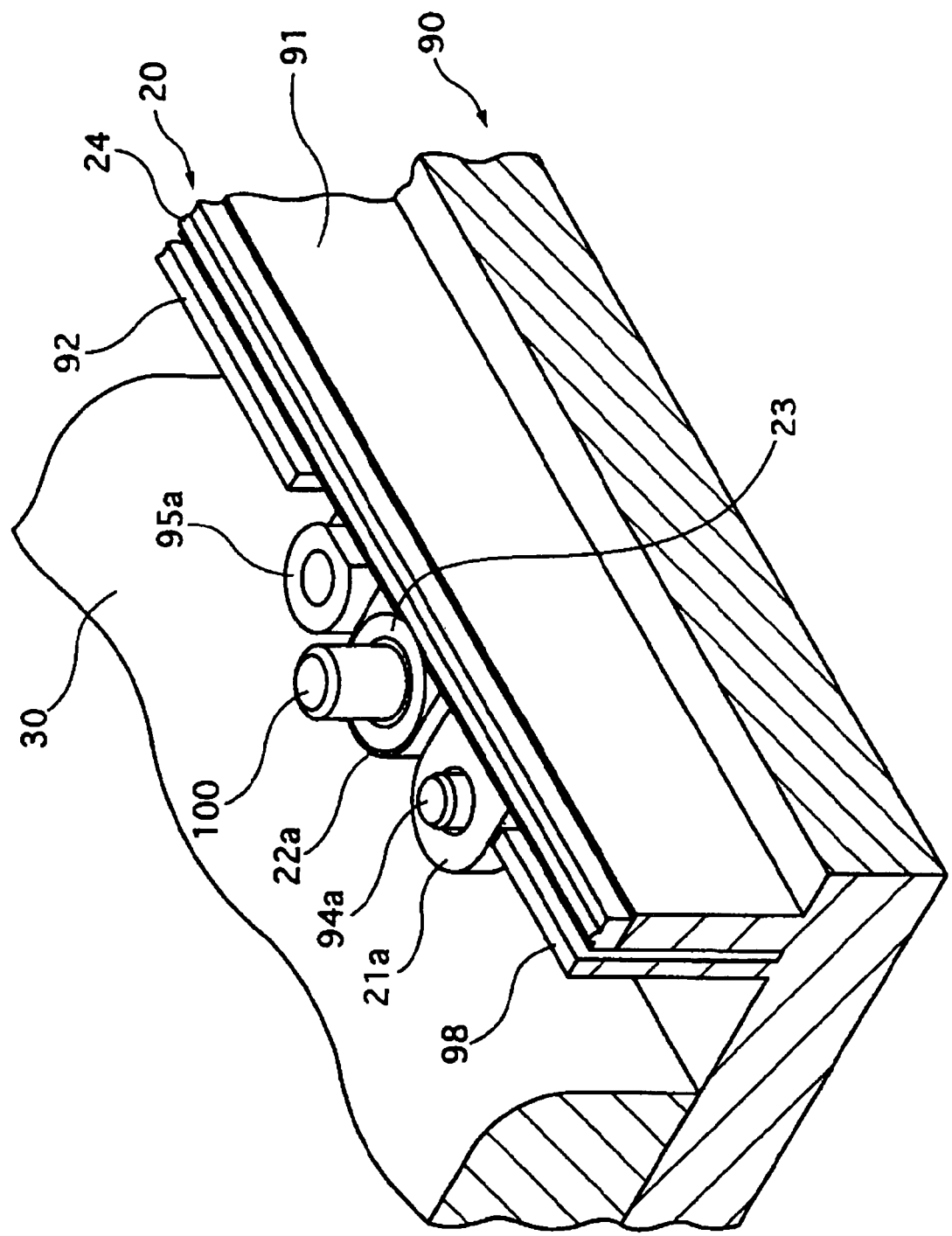
FIG. 16 is an enlarged perspective view of a portion of the lower half part near the boss of the information storage device in FIG. 1 from which the upper half part is removed.

FIG. 16 is an enlarged view of the boss 93a, the positioning pin 94, and the stopper 95a shown in FIG. 15. The lip 24 extending on the top surface of the gasket 20 mounted on the side wall 91 is compressed as it is pressed by the side wall 11 of the upper half part 10 to maintain the hermeticity between the side wall 91 of the lower half part 90 and the side wall 11 of the upper half part 10. In addition, the protection wall 92 provided to extend along the side wall 91 inside the side wall 91 prevents the gasket 20 from entering the housing 3 over the entire side wall 91 of the lower half part 90 to ensure the hermeticity of the housing 3. The protection wall 92 does not extend near the projection 22a located on the top surface of the boss 93a (not shown), the stopper 95a, and the positioning pin 94a. However, the screw 100, the positioning pin 94a, and the stopper 95a prevent the gasket 20 from entering the housing 3, instead of the protection wall 92. Furthermore, the lip 23 formed on the surface of the projection 22a and extending in the circumferential direction of the screw 100 is pressed by the upper half part 10 and the lower half part 90 to maintain the hermeticity near the screw hole formed in the boss 93a when the screw 100 is inserted into the screw hole formed in the boss 93a and tighten securely. The lip 24 formed on the gasket 20 is formed on the surface facing the side wall 11 of the upper half part 10 and the side wall 91 of the lower half part 90. The lips formed on both of the top surface and the bottom surface of the gasket 20 enable increased hermeticity of the housing 3.

Figure 17:
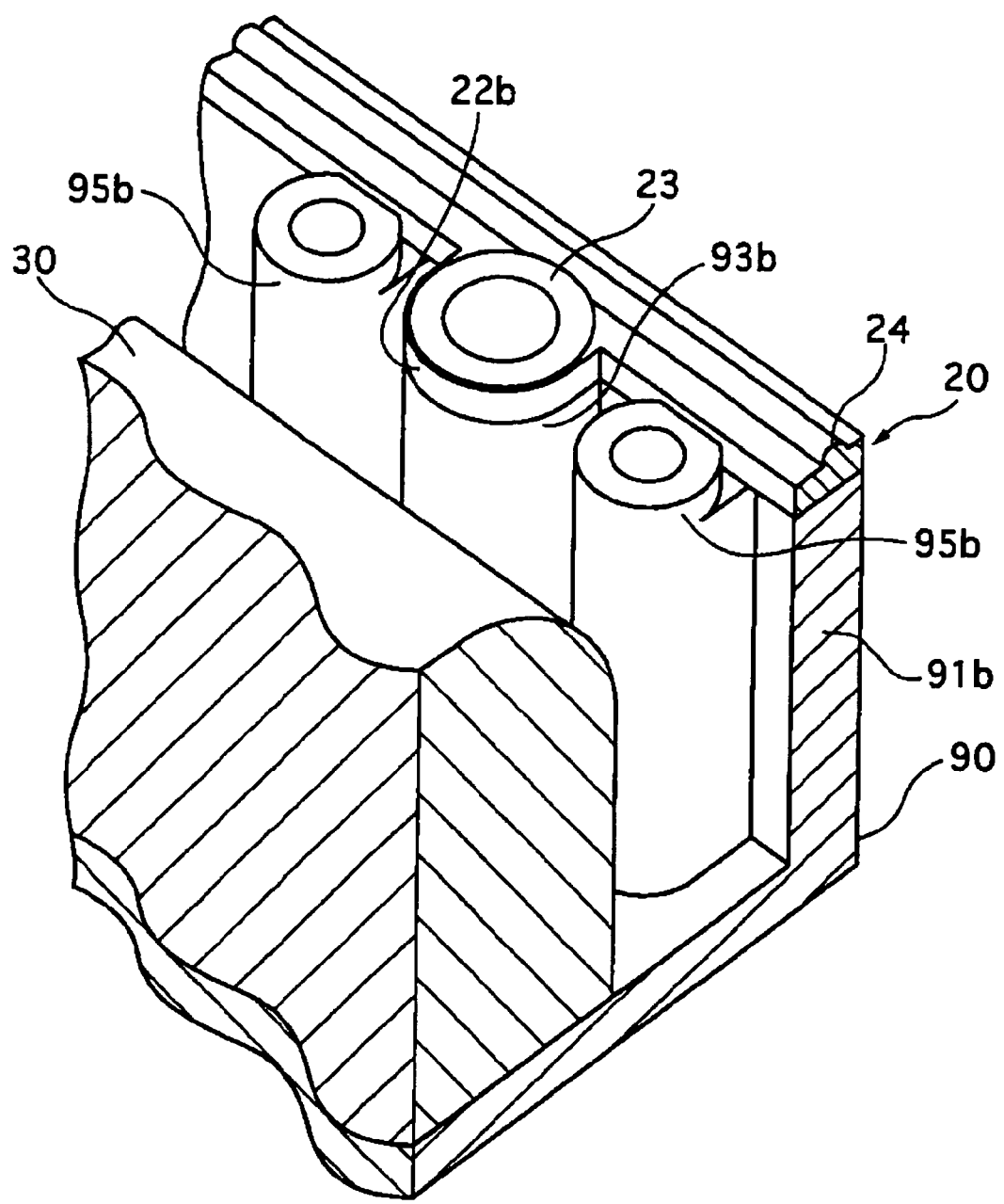
FIG. 17 is an enlarged perspective view of a portion of the lower half part near a boss formed inside a side wall opposite to a side wall having a opening formed therein of the information storage device in FIG. 1.

As shown in FIG. 17, the stopper 95b is formed to be adjacent to the boss 93b having the screw hole formed therein inside the side wall 91b in opposition to the opening 97 for disposing the connector 60 in the lower half part 90. The projection 22b protruding to the inside of the shorter side of the gasket 20 as the frame is put on the boss 93b such that the screw hole provided in the boss 93b is in line with the hole provided in the projection 22b to allow the screw to be inserted thereinto. The lip 23 is formed to extend in the circumferential direction of the hole on the surface of the projection 22 and is pressed by the side walls 11b and 91b of the upper half part 10 and the lower half part 90 to maintain the hermeticity near the screw hole formed in the boss 93b. The positions of the top surfaces of the stoppers 95b formed on both sides of the boss 93b are higher than the position of the top surface of the side wall 91b such that the top surfaces of the stoppers 95b protrude from the top surface of the side wall 91b by a smaller dimension than the thickness of the gasket 20. For example, when the lips 24 are formed on both surfaces of the gasket 20 with a thickness of 0.3 mm, and the gasket 20 has a thickness of approximately 1 mm in its flat portion, the top surface of the stopper 95b protrudes from the top surface of the side wall 91b approximately 1 mm. The gasket 20 is pressed by the upper half part 10 and the lower half part 90 while the stopper 95b suppresses excessive pressing of the gasket 20 such that the thickness of the gasket 20 is reduced approximately 30% of the original thickness, thereby allowing the gasket 20 to effectively provide its own hermetic property.

Figure 18A:
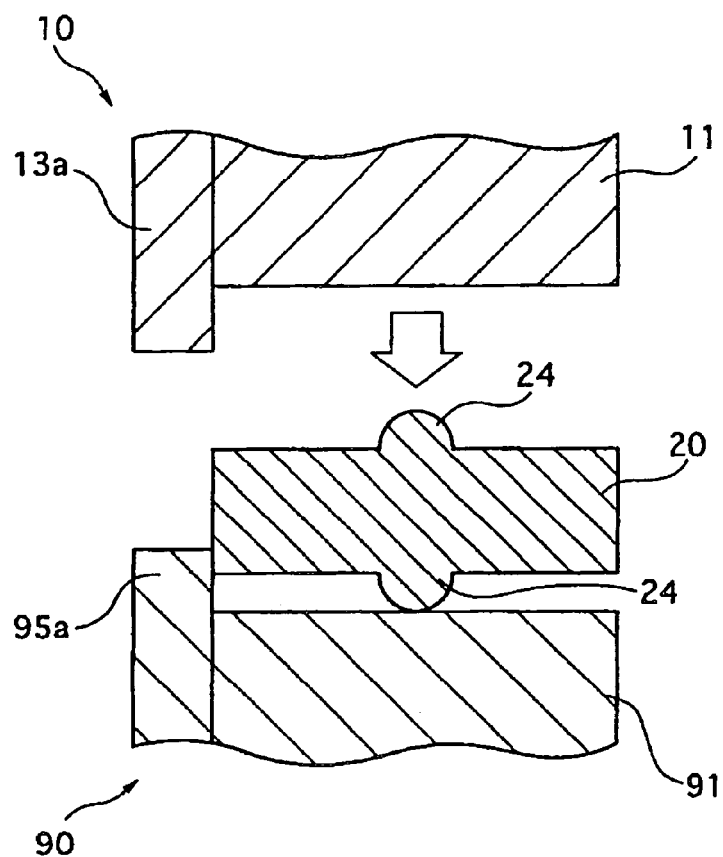
FIGS. 18A and 18B are schematic diagrams for explaining how the gasket is pressed by the upper half part and the lower half part, and specifically.
Figure 18B:
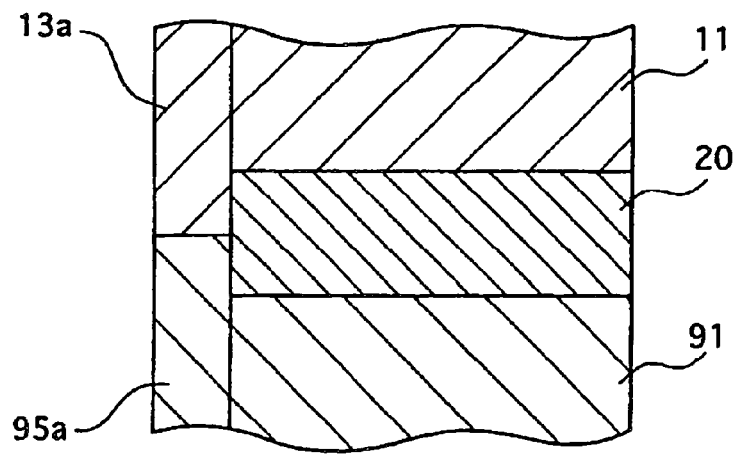

Description is made for the gasket 20 sandwiched between the upper half part 10 and the lower half part 90 with reference to FIGS. 18A and 18B. As shown in FIG. 18A, the gasket 20 disposed on the top surface of the side wall 91 of the lower half part 90 is interposed between the side wall 11 of the upper half part 10 and the side wall 91 of the lower half part 90. Then, as shown in FIG. 18B, the gasket 20 pressed by the side walls 11 and 91 is sandwiched between the side walls 11 and 91 with the lip 24 pressed. When the upper half part 10 is secured to the lower half part 90, the stoppers 13a and 95a formed in the upper half part 10 and the lower half part 90 abut on each other to control the thickness of the pressed gasket 20. Thus, when the upper half part 10, the lower half part 90, and the gasket 20 are secured by the screws, excessive pressing of the gasket 20 by tightening the screws too much can be prevented, and efficiently maintain the hermeticity of the whole housing 3. In addition, the stoppers 13b and 95b formed to be adjacent to the bosses 93b and 12b formed on the shorter sides of the upper half part 10 and the lower half part 90 abut on each other to suppress excessive pressing of the gasket 20 on the shorter sides as well.

Figure 19:
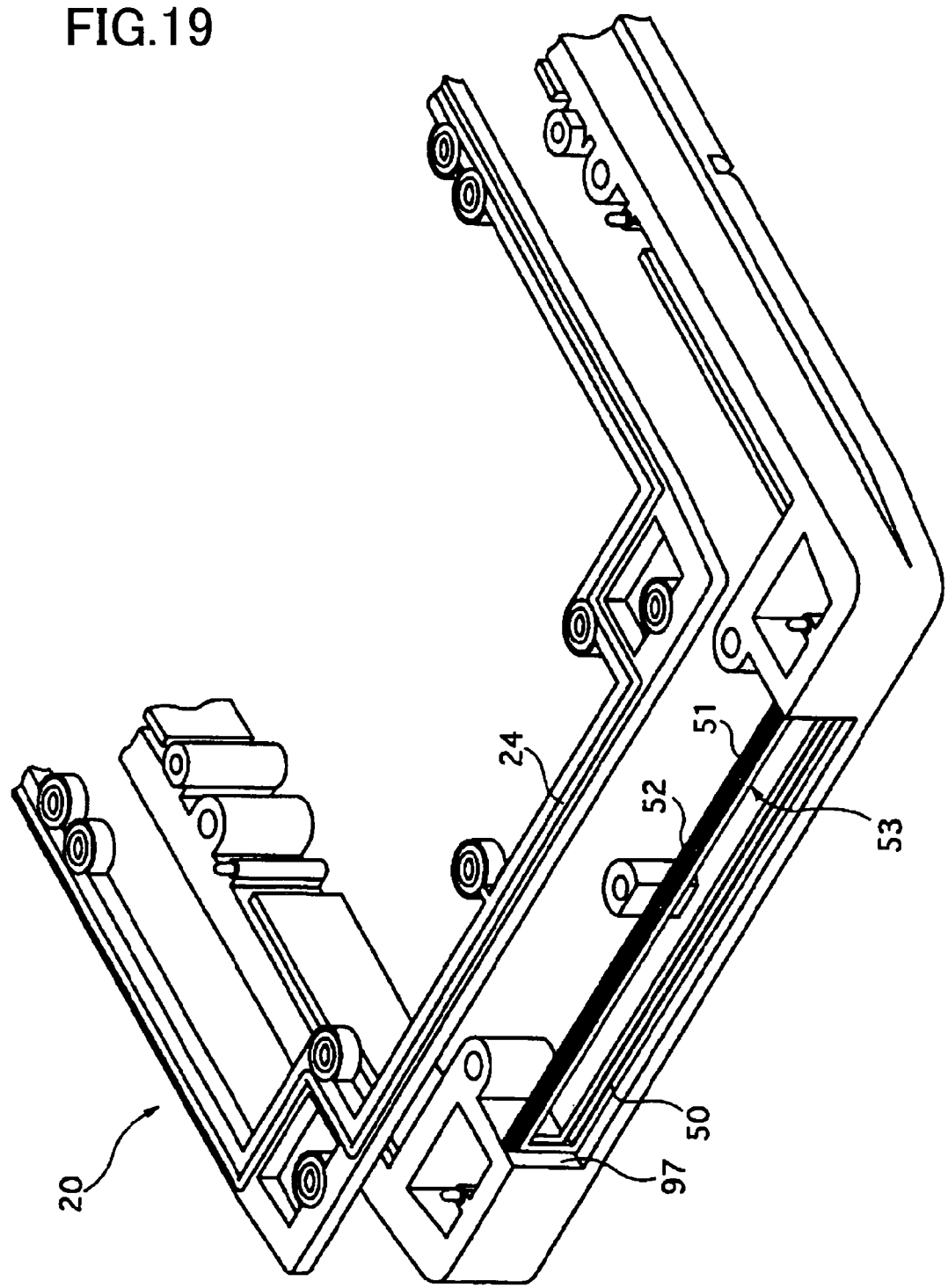
FIG. 19 is a perspective view for explaining how the gasket and the packing abut on each other.

Subsequently, description is made for the packing 50, into which the connector 60 fits, and the gasket 20 disposed between the upper half part 10 and the lower half part 90 in more detail with reference to FIGS. 19 to 21. It should be noted that the connector 60 fitted into the packing 50 is not shown in FIGS. 19 to 21. As shown in FIG. 19, the two lips 51 and 52 are formed on the surface of a long portion 53 of the periphery of the packing 50 as the frame abutting on the gasket 20 having the lip 24 formed thereon. The lips 51 and 52 are projective lines extending in the longitudinal direction of the long portion 53 and formed to extend from one end to the other end of the opening 97. The connector 60 fitted into the packing 50 is disposed in the opening 97. In this event, the lip 24 formed in the gasket 20 abuts on the surface between the lips 51 and 52 formed on the long portion 53 of the packing 50. Although not shown in FIG. 19, the lips 51a and 52a which are extensions of the lips 51 and 52 on the sides of the packing 50 are pressed by the opening 97 to enhance the hermeticity of the side edge of the connector 60.

Figure 20:
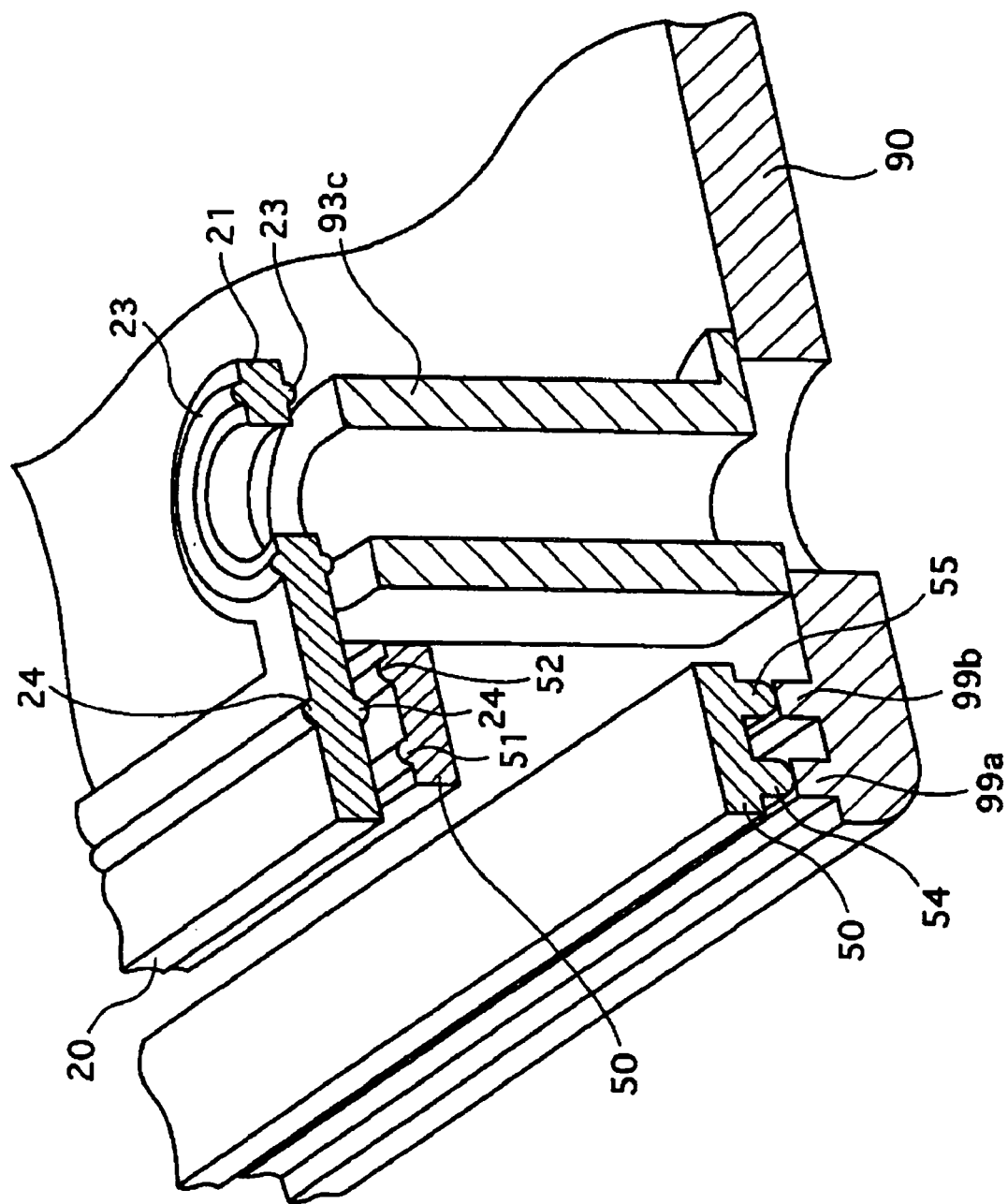
FIG. 20 is a perspective sectional view for explaining how the gasket and the packing abut on each other.

FIG. 20 is a perspective sectional view which enlargedly shows the packing 50, into which the connector 60 fits, and the gasket 20 abutting on each other. The projection 21 formed on the gasket 20 is disposed above the boss 93c to cover its top surface such that screw holes formed in the boss 93c and the projection 21 are arranged in line to form a single screw hole. The lips 23 are formed on both surfaces of the projection 21 to surround the screw hole. The lips 23 are pressed by the top surface of the boss 93c and the boss 12c formed on the upper half part 10 to maintain the hermeticity near the screw hole. In addition, the lips 24 are formed on both surfaces of the gasket 20 along the periphery forming the gasket as the frame. The lip 24 formed on the back of the gasket 20 abuts on the packing 50 between the two lips 51 and 52. Two lips 54 and 55 are formed on the surface of the packing 50 abutting on the lower half part 90 to have a substantially arc shape in cross section and extend along the shape of the packing 50. The lips 54 and 55 to come in contact with the lower half part 90 abut on and are pressed by two projective lines 99a and 99b formed on the bottom of the lower half part 90 to seal a portion of the connector 60 on the lower half part 90.

Figure 21A:
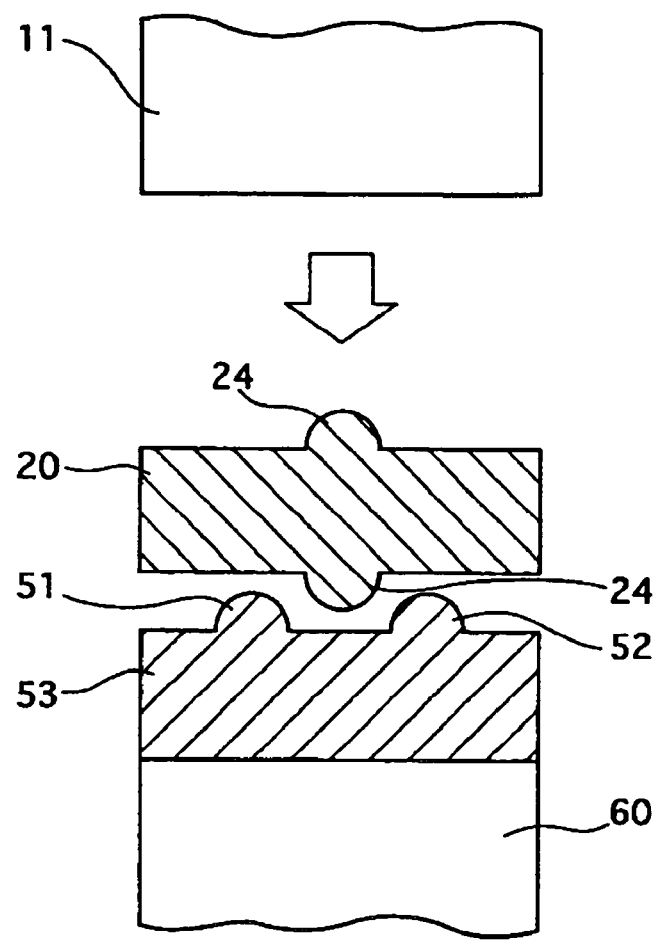
FIGS. 21A and 21B are schematic diagrams for explaining how the gasket and the packing are pressed by the upper half part and the connector, and specifically.
Figure 21B:
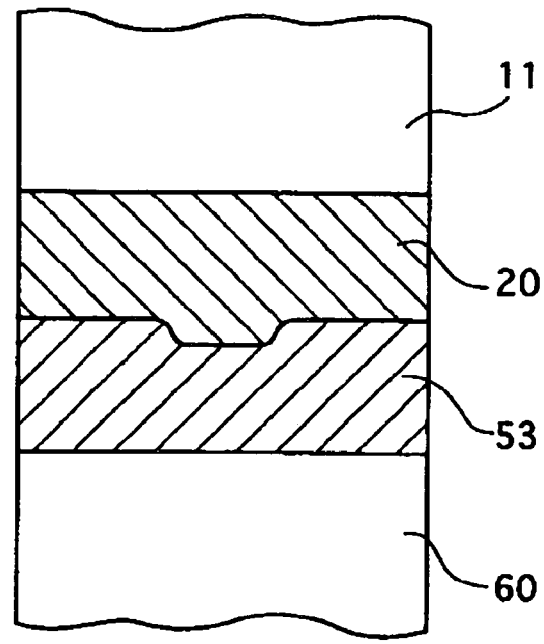

FIG. 21 is a sectional view for explaining the state in which the packing 50, into which the connector 60 fits, and the gasket 20 are pressed, in more detail. The two lips 51 and 52 extend in the longitudinal direction of the long portion 53 on the top surface of the long portion 53 forming part of the periphery of the packing 50. The lip 24 extends on the surface of the gasket 20 abutting on the top surface of the long portion 53 in parallel with the lips 51 and 52 extending on the long portion 53. The two lips 51 and 52 formed on the packing 50 and the lip 24 formed on the gasket 20 are shifted in cross section such that they do not overlap each other when the gasket 20 abuts on the packing 50. In this embodiment, as shown in FIG. 21A, the lip 24 is formed on the gasket 20 to abut on the packing 50 between the two lips 51 and 52. Thus, as shown in FIG. 21B, the packing 50 and the gasket 20 are sandwiched between the connector 60 and the side wall 11 of the upper half part 10 and maintain the hermeticity of the upper portion of the connector 60. In addition, the lips 51a and 52a formed in shorter portions of the packing 50 are pressed by the opening 97 to enhance the hermeticity on the side edge of the connector 60.

In this manner, the hermeticity is enhanced on the sides of the housing 3, near the screw holes, and around the connector 60. This makes is possible to increase the hermeticity of the whole housing 3 to seal the hard disk driving mechanism 30 accommodated in the housing 3. As a result, it is possible to suppress erroneous operation of the hard disk driving mechanism 30 caused by a change in outside air pressure and degradation of the hard disk driving mechanism 30 due to a material entering from the outside of the housing 3.

Figure 22:
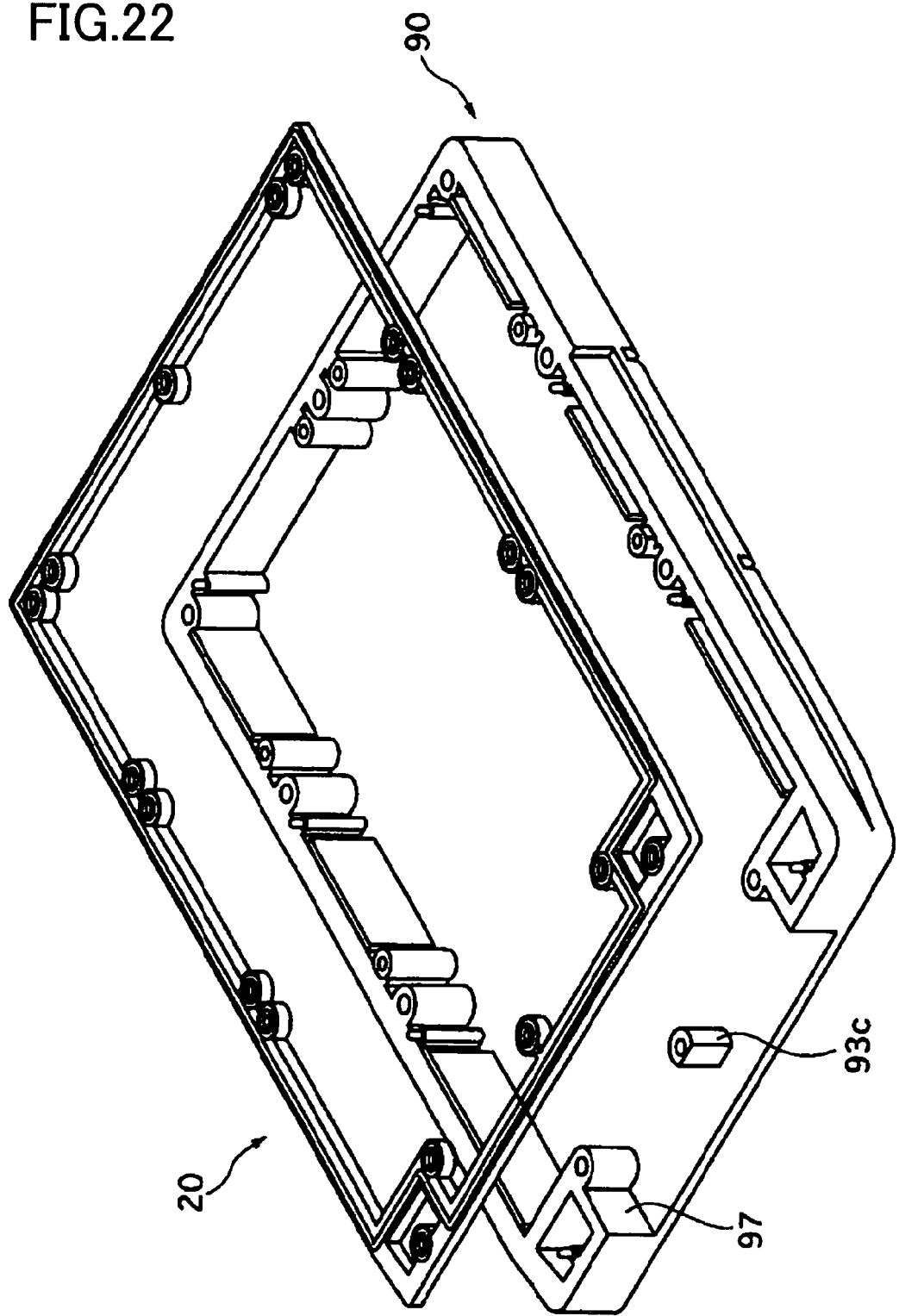
FIG. 22 is a perspective view of a support doubling as a boss.

Description is hereinafter made for the support for preventing breakage of the connector due to stress applied to the connector when the information storage device 1 is inserted into the device body. FIG. 22 is a perspective view of the lower half part 90 viewed from the opening 97 in which the connector is disposed. The connector is not shown in FIG. 22. As shown in FIG. 22, the support is formed to be located in the area adjacent to the opening 97 formed for disposing the connector. The support doubles as the boss 93c having the screw hole into which a screw is inserted when the upper half part 10 is secured to the lower half part 90. The side of the boss 93c facing the connector is formed to have a substantially flat portion such that it can support the back of the connector in a certain area. Thus, the boss 93c can support the connector to prevent breakage of the connector even when stress is applied to the connector to force the connector into the housing 3.

When inserting the information storage device 1 of this embodiment into the device body, a connector formed in the device body abuts on the connector formed in the information storage device 1 by spring force, large spring force causes an arch warp at the center of the connector to result in poor contact between the connectors formed in the device body and the information storage device 1. In addition, a contact fault may occur between the connectors. While the single support doubling as the boss 93c is formed in the area adjacent to the opening 97 in this embodiment, a plurality of bosses may be formed to be abut on the back of the connector and serve as supports to support the connector. The supporting of the connector by the plurality of bosses can more stably support the connector. Thus, when the information storage device 1 is assembled, the boss doubles as the support for supporting the connector to not only maintain the hermeticity but also form the connector with high reliability without involving an increase in number of the parts.

Figure 4A:
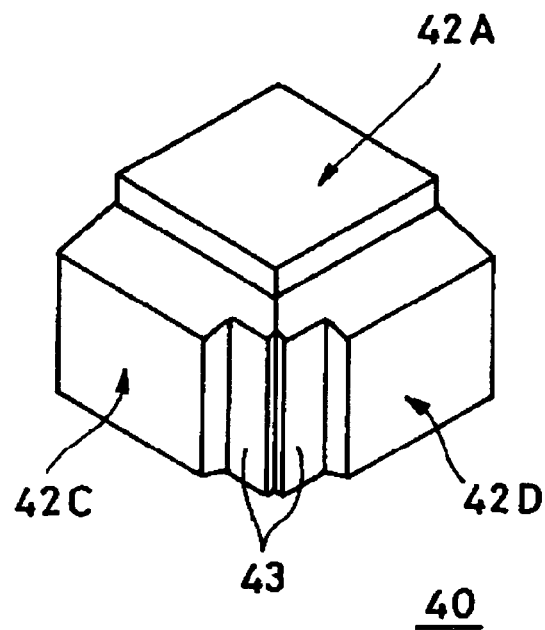
FIGS. 4A and 4B are enlarged views of a cushioning material of the information storage device in FIG. 1.
Figure 4B:
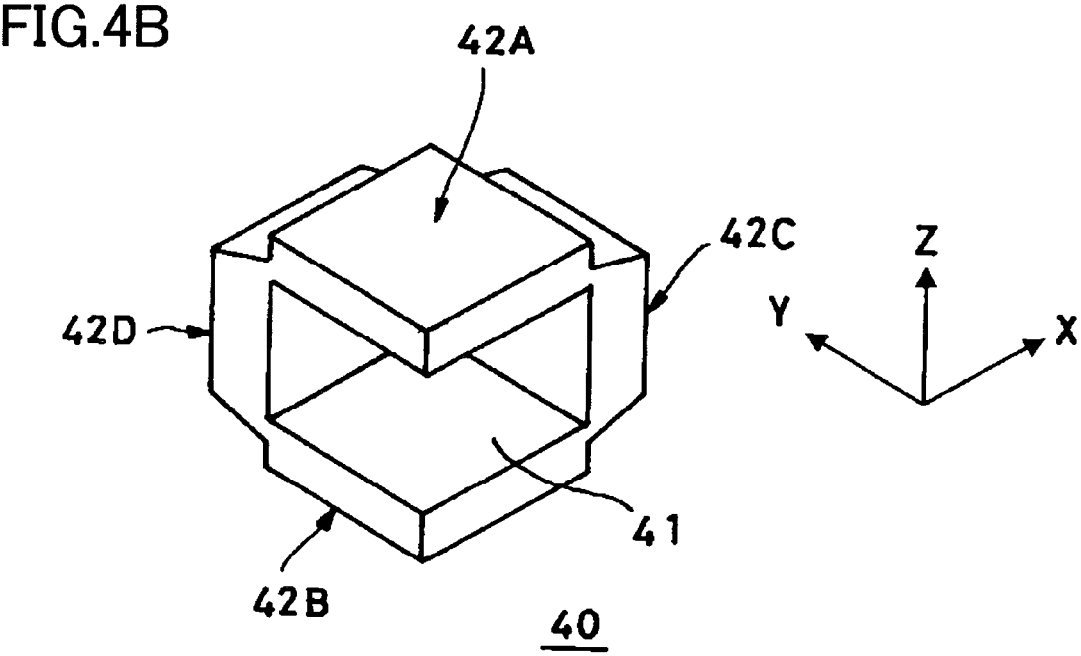

In addition, in the embodiment, the cushioning material 40 for shock absorption has a characteristic configuration. FIGS. 4A and 4B are enlarged views of the cushioning material 40. As shown in FIGS. 4A and 4B, the cushioning material 40 has a space within its substantially rectangular parallelepipedic main body (with no reference numeral) to come in contact with the outer surface of the hard disk driving mechanism 30 serving as an inside housing (an inner housing) to cover the hard disk driving mechanism 30. The space is a fitting portion 41 in which the outer surface of the hard disk driving mechanism 30 fits. On the other hand, projections are formed on an upper surface (a top plate) 42A and a lower surface (a bottom plate) 42B in a Z direction, a side surface (a connecting plate) 42C in an X direction, and a side surface (a connecting plate) 42D in a Y direction in FIGS. 4A and 4B to protrude from the main body toward the lower half part 90 and the upper half part 10 which are outside housings (outer housings). In FIGS. 4A and 4B, openings 43 are provided for the purpose of avoiding the bosses, the positioning pins, and the stoppers of the lower half part 90 or facilitating the fitting to the outside housings 10 and 90.

The projections 42A, 42B, 42C, and 42D formed in the four directions have flat surfaces along the inner surfaces of the lower half part 90 and the upper half part 10, which are the outside housings (outer housings), and the flat surfaces contact with the outer housings. Since the projections 42A, 42B, 42C, and 42D protrude from the main body toward the outside housings, space is formed between the respective projections 42A, 42B, 42C, and 42D even when the cushioning materials 40 are mounted on the outer housings. Each of the projections 42A, 42B, 42C, and 42D can be deformed using the space, so that shock can be absorbed through the deformation of the cushioning material 40 to prevent the shock on the inner housing, that is, the hard disk driving mechanism 30.

The mechanism of the shock absorption by the cushioning material 40 is hereinafter described in more detail.

When the device 1 receives a shock from the outside, the relative position of the item to be protected by the cushioning material (the inner housing or the hard disk driving mechanism 30) is changed within the outer housing (the upper half part 10 and the lower half part 90). At this point, since the contact surfaces of the projections 42A, 42B, 42C, and 42D are in contact with and confined by the inner wall of the outer housing, for example, the thicknesses of the projections (the connecting plates) 42C and 42D in the X and Y directions are greatly changed, that is, they are thinned for an instant.

Since the total volume of the cushioning material 40 is not changed, the cushioning material 40 is expanded in the Z direction (vertical direction) while the projections 42C and 42D are deformed to be thinner. In addition, the expanded cushioning material 40 easily enters the space (an upper spacing and a lower spacing) between the projections (the top plate and the bottom plate) 42A and 42B in the Z direction and the projections (the connecting plates) 42C and 42D in the X and Y directions. The cushioning material 40 can be smoothly deformed to reduce shock acceleration to the item to be protected by the cushioning material(the inner housing or the hard disk driving mechanism 30). Similarly, the projections (the top plate and the bottom plate) 42A and 42B in the Z direction (vertical direction) protrude from the main body, and when the device 1 receives a shock in the Z direction from the outside, the projections (the top plate and the bottom plate) 42A and 42B in the Z direction are compressed and can be expanded in the X and Y directions to reduce shock acceleration in the Z direction.

In the embodiment, especially each of the contact surfaces of the projections 42C and 42D on the sides has a smaller area than the main body of the cushioning material 40. Accordingly, the space for deformation is increased to facilitate the deformation. On the other hand, each of the contact surfaces of the projections 42A and 42B on the upper and lower surfaces has substantially the same area as the main body of the cushioning material 40.

Figure 27:
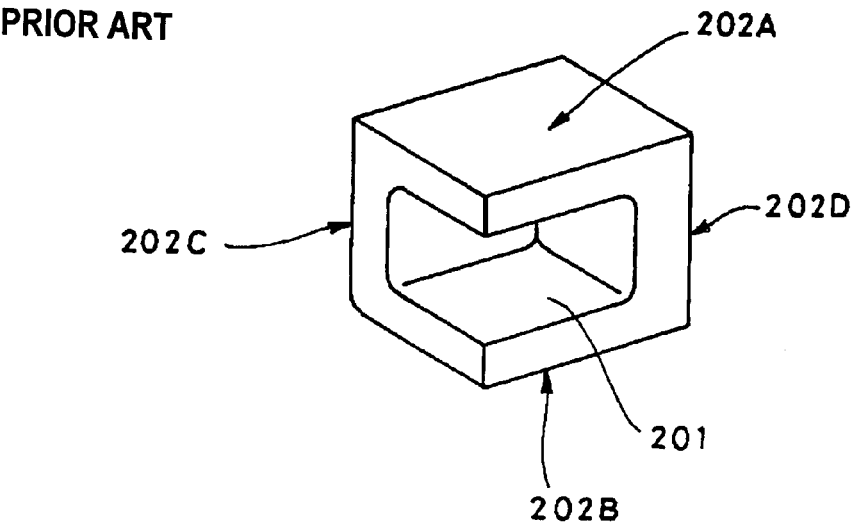
FIG. 27 is a perspective view showing the general structure of a conventional cushioning material.
Figure 28:
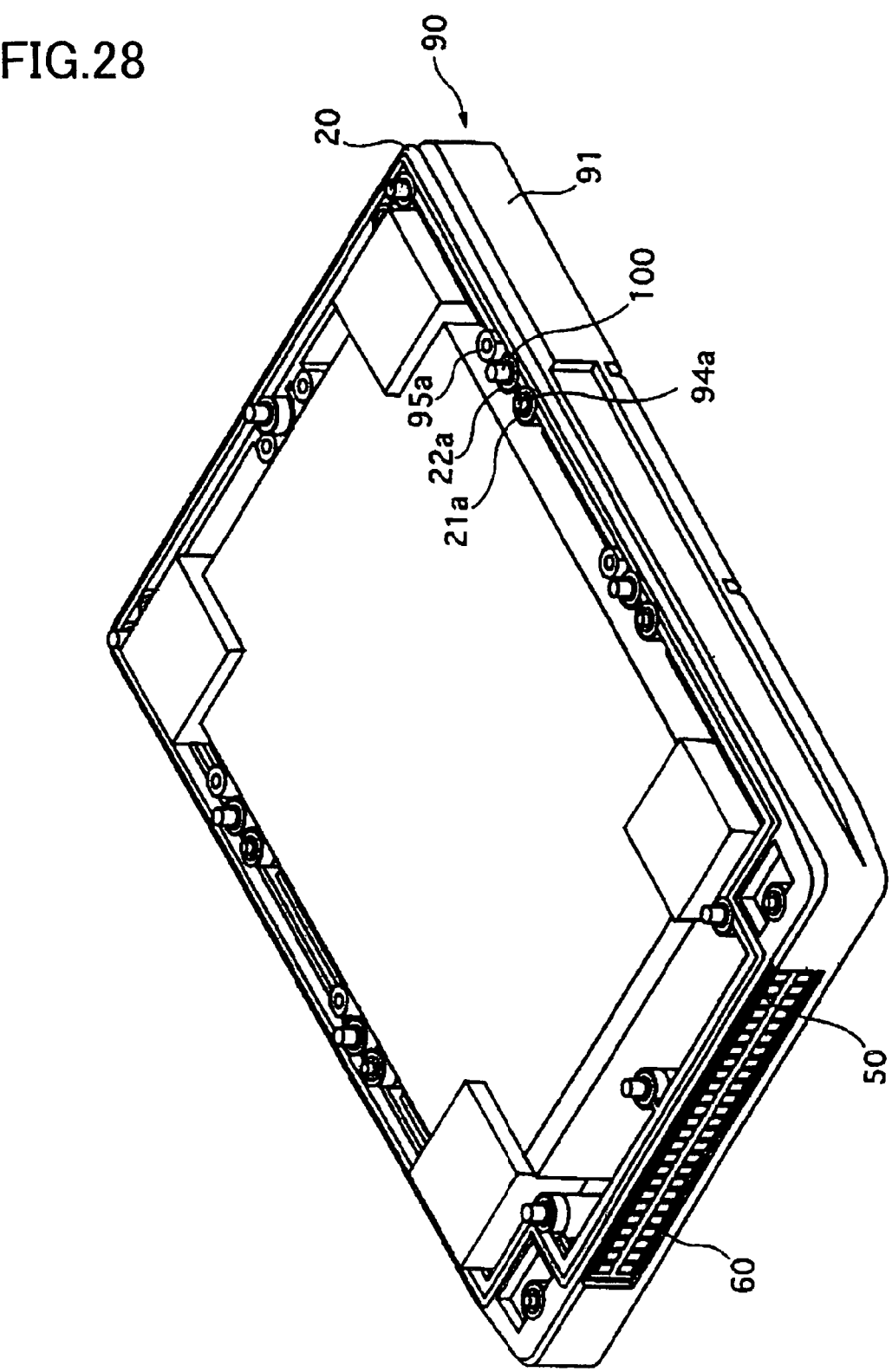
FIG. 28 is a perspective view showing the internal general structure of an information storage device provided with the cushioning materials in FIG. 27.

In the present invention, the configuration of the projections provided for the cushioning material is not limited to the above-mentioned one in the embodiment, and any configuration may be used as long as space can be provided for the projections to deform for shock absorption. Specifically, a projection may be formed to protrude from the main body of the cushioning material in at least two directions of the three directions of X, Y, and Z, or one or more projections may be formed as a contact surface smaller than the main body. Such a configuration provides space for deformation between the cushioning material and the outer housing, and the projection is deformed in the space. Since the deformation is facilitated as compared with the conventional cushioning material 200 (see FIG. 27) with no projections, the effect of shock absorption can be enhanced.

Figure 23:
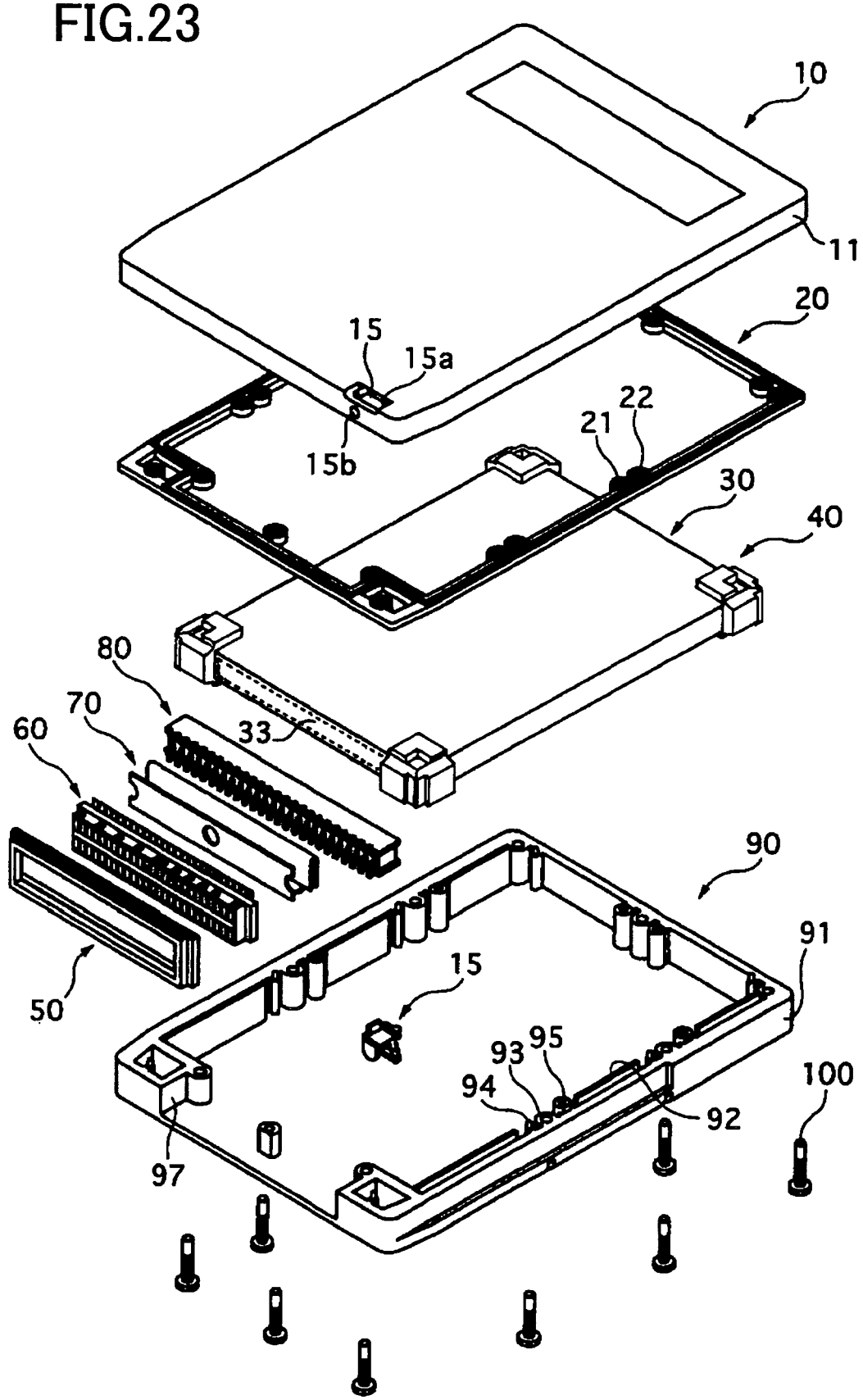
FIG. 23 is an exploded perspective view showing the general structure of an information storage device according to another embodiment of the present invention.

Next, FIG. 23 is a schematic view (a exploded perspective view) showing the structure of an information storage device 2 as another embodiment of the present invention. As seen from comparison between FIG. 23 and FIG. 2 of the above-mentioned embodiment, the information storage device 2 of the embodiment differs from the information storage device 1 in FIG. 2 in the structure of a cushioning material 40. The other components are similar to those in the embodiment shown in FIG. 2, so that the same reference numerals are used to omit repetitive description.

Figure 24A:
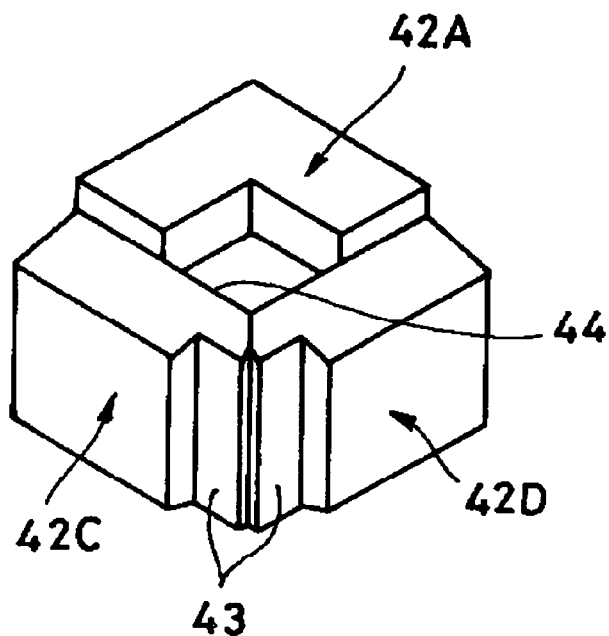
FIGS. 24A and 24B are perspective views showing the general structure of a cushioning material of the information storage device in FIG. 23.
Figure 24B:
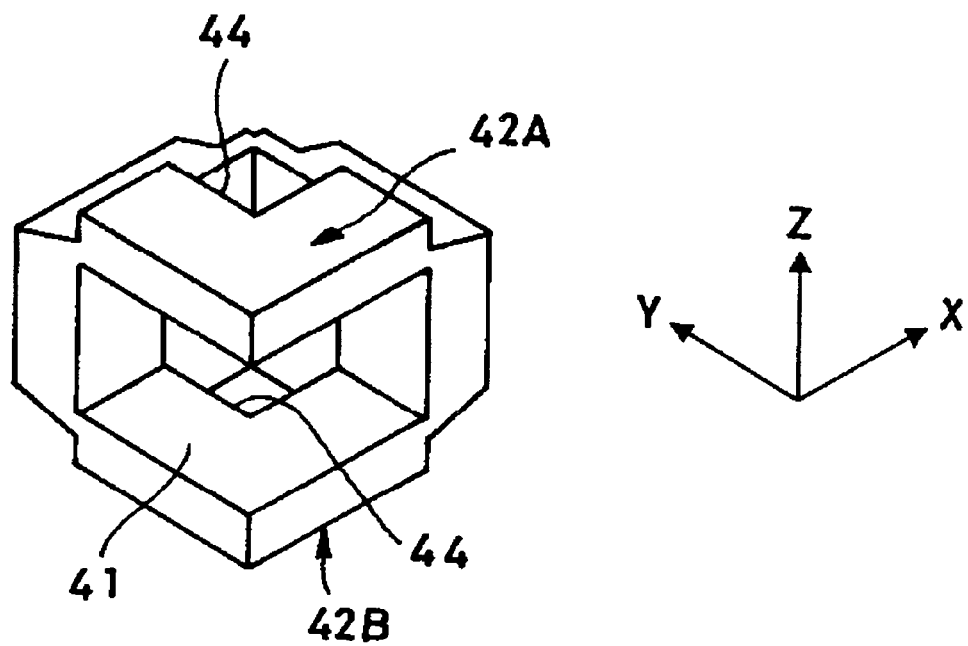

FIGS. 23 and 24 are schematic views (enlarged perspective view) showing the structure of the cushioning material 40 in FIG. 23. In the embodiment, while the basic shape of the cushioning material 40 is the same as the above-mentioned embodiment, the cushioning material 40 in the embodiment has through holes 44 in respective projections 42A and 42B on a top plate and a bottom plate to be open to space of an inner fitting portion 41. The through holes 44 are provided for the purpose of promoting deformation of the projection 42A on the top plate and the projection 42B on the bottom plate.

In the embodiment, when the projections (the top plate and the bottom plate) 42A and 42B of the cushioning material 40 in a Z direction are compressed in the Z direction, the compressed projections can extend into space between the projections 42A, 42B, 42C, and 42D, and even into the through holes 44 in a horizontal direction (an X direction and a Y direction). As a result, the cushioning effect can be achieved without significantly compressing the cushioning material 40 when the device 2 receives a shock from the outside.

Figure 25:
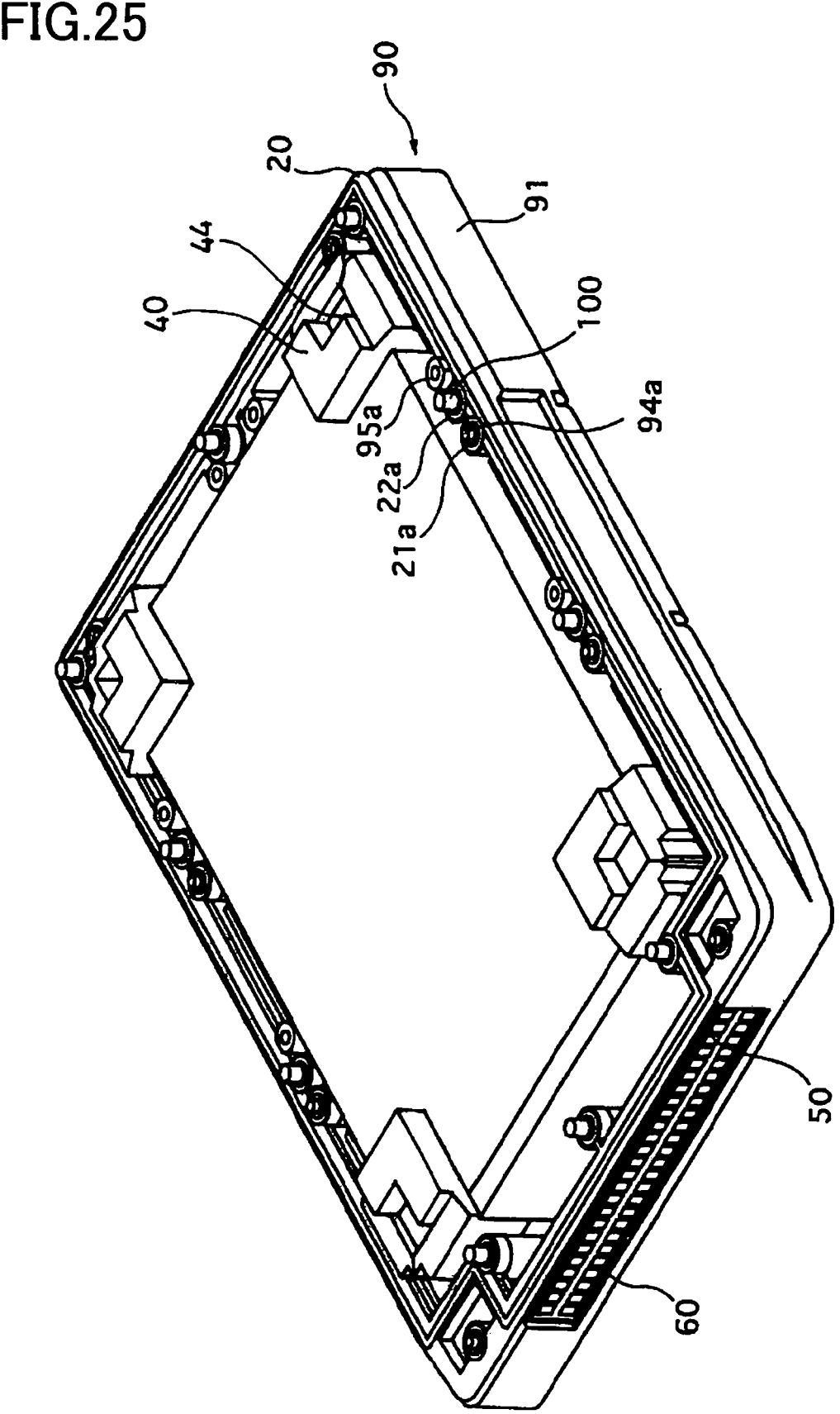
FIG. 25 shows the structure of the information storage device in FIG. 23 from which an upper half part is removed.

FIG. 25 shows a perspective view of the information storage device 2 from which an upper half part 10 is removed in the embodiment. In FIG. 25, a junction FPC 70 and an IDE socket 80 are not shown similarly to FIG. 15.

According to the embodiment, similarly to the above-mentioned embodiment, the cushioning material 40 has the projections 42A, 42B, 42C, and 42D protruding from the main body to the upper half part 10 and a lower half part 90 which are outer housings, so that space is provided between the projections 42A, 42B, 42C, and 42D while the cushioning materials 40 are mounted on the outer housings. The projections 42A, 42B, 42C, and 42D can be deformed easily in the space to absorb shock. In addition, according to the embodiment, since the through holes 44 are formed in the projections 42A and 42B on the top plate and the bottom plate of the cushioning material 40 to be open to the space of the inner fitting portion 41, the projections 42A and 42B on the top plate and the bottom plate can be easily deformed in the through holes 44 to absorb shock. Thus, shock absorption can be achieved effectively to avoid shock on the hard disk driving mechanism 30 accommodated an inner housing.

Figure 26:
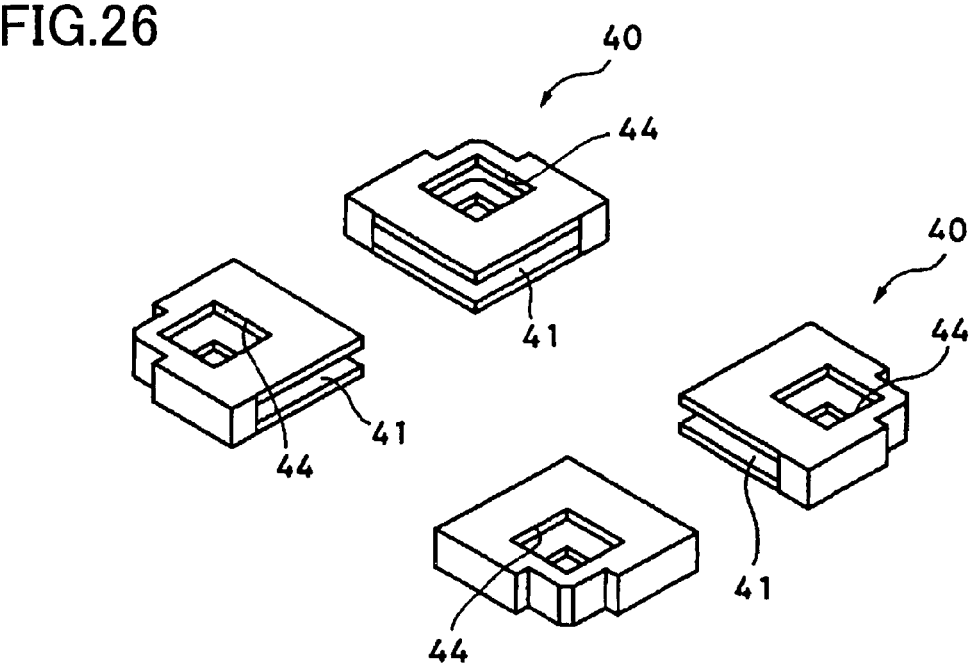
FIG. 26 shows cushioning materials configured to have no projections and have through holes.

While the embodiment employs the projections and the through holes 44 for promoting deformation in the cushioning material 40, the cushioning material may have no projection and have a through hole 44 for promoting deformation, for example as shown by a perspective view illustrating such a cushioning material in FIG. 26. The through hole 44 can promote deformation of the cushioning material 40 to improve the effect of shock absorption over the structure of the conventional cushioning material 200.

While the embodiment employs the through holes 44 for promoting deformation in the cushioning material 40, the through holes may not necessarily extend to the fitting portion 41 for promoting deformation. At least a hole opened to a surface to come in contact with an outer housing is provided, such a cushioning material provides the effect of facilitating deformation as compared with the conventional structure with no hole. The hole for promoting deformation may be formed in side surfaces 42C and 42D of the cushioning material 40, not limited to the upper surface (the top plate) 42A and the lower surface (the bottom plate) 42B of the cushioning material 40.

Figure 29A:
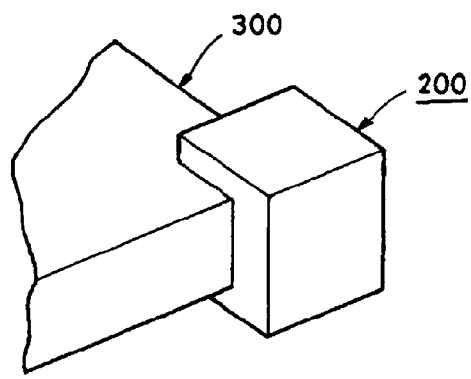
FIG. 29A shows the use of the conventional cushioning material shown in FIG. 27.
Figure 29B:
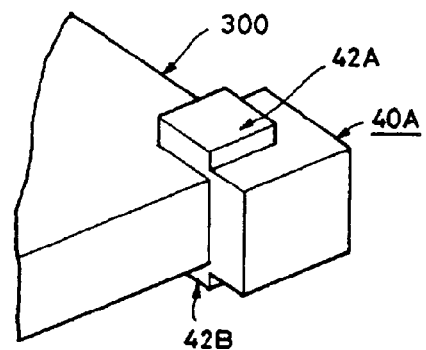
FIG. 29B shows the use of a cushioning material provided with projections on an upper surface and a lower surface.
Figure 29C:
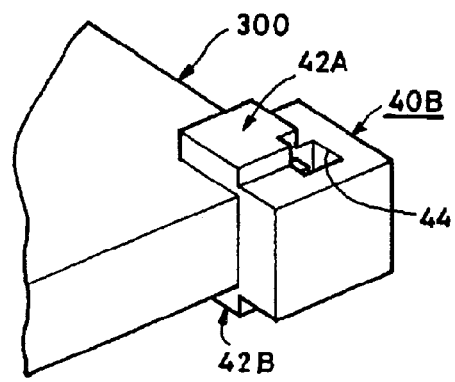
FIG. 29C shows the use of a cushioning material provided with projections and through holes in an upper surface and a lower surface.
Figure 29D:
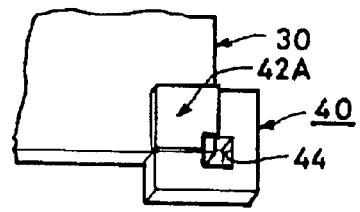
FIG. 29D shows the cushioning material in FIG. 29C from the top.

The differences in response against the shock of cushioning materials having different structures were examined. FIG. 29A shows the use of a cushioning material 200 of the conventional structure shown in FIG. 27. FIG. 29B shows the use of a cushioning material 40A provided with projections 42A and 42B on an upper surface and a lower surface, respectively. FIG. 29C shows the use of a cushioning material 40B provided with projections 42A and 42B on an upper surface and a lower surface, respectively, and with through holes 44 in the upper and lower surfaces. FIG. 29D shows the cushioning material 40B viewed from the top in FIG. 29C. These cushioning materials 200, 40A, and 40B were formed such that their surfaces to come in contact with outer housings should be the same positions. The upper and lower surfaces of the cushioning material 200 in FIG. 29A can be subjected to processing to leave the projections 42A and 42B, thereby providing the cushioning material 40A in FIG. 29B. In addition, the cushioning material 40A can be subjected to processing to form the through holes 44 in the upper and lower surfaces, thereby providing the cushioning material 40B.

Figure 30:
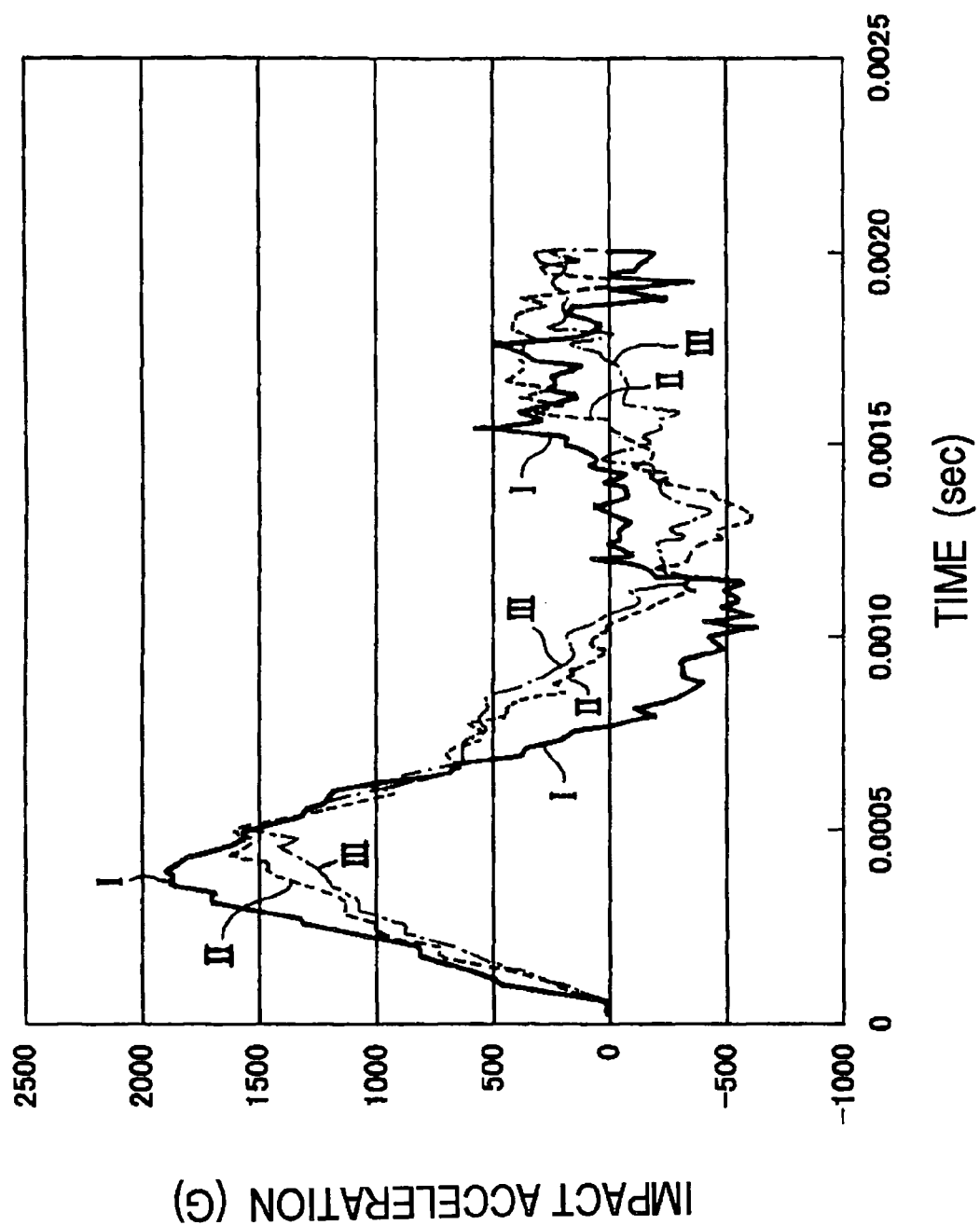
FIG. 30 is a graph showing the results of comparisons of responses to shock obtained when the cushioning materials shown in FIGS. 29A to 29C are used.

Each of the cushioning materials 200, 40A, and 40B was fitted to four corners of an inner housing 300 in which a hard disk driving mechanism was accommodated. The cushioning materials and the inner housing were accommodated in an outer housing (not shown) of a right size. Then, the outer housing was dropped in a vertical direction (a Z direction) to apply a shock, and the shock on the hard disk driving mechanism in the inner housing 300 was investigated. FIG. 30 shows the results as a graph in which the horizontal axis represents time and the vertical axis represents a shock acceleration (G). In FIG. 30, a curve I shows the result of the cushioning material 200 in FIG. 29A, a curve II shows the result of the cushioning material 40A in FIG. 29B, and a curve III shows the result of the cushioning material 40B in FIG. 29C.

FIG. 30 shows that, as the structures of the cushioning materials change as shown by the curve I, the curve II, and to the curve III, the peak values of the shock acceleration are reduced. It can be seen from the results that the shock can be absorbed more effectively by providing the projections on the surfaces coming in contact with the outer housing of the cushioning material or forming the through holes.

The cushioning material of the present invention can be used in various devices including electronic devices other than the information storage devices as in the respective embodiments described above. The cushioning material with the structure according to the present invention can provide improved resistance to shock on the device accommodated in the inner housing. Especially when the inner housing has a portion (a weak portion) in which it is not preferable to provide the cushioning material as the hard disk driving mechanism of the above-mentioned respective embodiments, the cushioning material with the structure according to the present invention is mounted while such a portion is avoided. Consequently, the device can have improved resistance to shock.

The present invention is not limited to the above-mentioned respective embodiments, and various configurations can be made without departing from the spirit and scope of the present invention.

What is claimed is:

1. A cushioning material for supporting an inner first housing and an outer second housing in spaced apart relation, comprising:
   a main body having a space within which at least a portion of only one of a plurality of corners of said first housing is received, and having a portion which comes into contact with an outer surface of said first housing for covering at least part of said first housing;
   four projection portions formed to protrude from said main body toward said second housing, and provided on each of an upper surface, lower surface, and side surfaces of said main body and
   an opening formed at the corner of said main body, wherein,
   each one of said four projection portions has a contact surface which comes into contact with a corresponding inner surface of said second housing,
   said contact surface is formed so as to extend along said corresponding inner surface of said second housing, and
   each one of said four projection portions being so configured that it can deform within a space under said second housing to absorb shock.

2. An information storage device removably mounted on a device body, comprising:
   a hard disk driving mechanism;
   a first housing for accommodating said hard disk driving mechanism therein;
   a second housing for accommodating said first housing therein; and
   a connector portion,
   wherein,
   said first housing is supported by a cushioning material to have a distance between said first housing and said second housing,
   said cushioning material has a main body having a space within which at least a portion of only one of a plurality of corners of said first housing is received, and having a portion which comes into contact with an outer surface of said first housing to cover at least part of said first housing, an opening formed at the corner of said main body; and
   said cushioning material has four projection portions formed to protrude from said main body toward said second housing, and provided on each of an upper surface, lower surface, and side surfaces of said main body,
   each one of said four projection portions has a contact surface in which comes into contact with a corresponding inner surface of said second housing, and is formed to extend along said corresponding inner surface of said second housing, and
   each one of said four projection portions is effective to undergo suitable deformation with a space defined by said inner surface so as to absorb shock experienced by said first and second.

3. A cushioning device for maintaining first and second housings in spaced apart relation, said device comprising:
   a main body with a space therein so configured to accommodate therein at least a portion of only one of a plurality of corners of said first housing, said main body having four outer surfaces formed on each of an upper surface, a lower surface, and side surfaces of said main body to come into contact with corresponding inner surfaces of said second housing; and
   a shock absorbing configuration in said main body effective to deform to absorb mechanical shock experienced by said first and second housings while maintaining said spaced apart relations,
   wherein,
   said shock absorbing configuration comprises an opening formed at the corner of said main body which is effective to deform to absorb shock when said first and second housings are subjected to mechanical shock.

4. The cushioning device of claim 3, wherein said shock absorbing configuration comprises at least one projection on each of said upper surface, lower surface, and side surfaces of said main body of said main body.

5. The cushioning device of claim 3, wherein three orthogonal outer surfaces form a corner, and said shock absorbing configuration comprises projections.

6. A cushioning material for supporting an inner first housing and an outer second housing in spaced apart relation, comprising:
   a main body having a space within which at least a portion of only one of a plurality of corners of said first housing is received, an inner surface which comes into contact with an outer surface of said first housing for covering at least part of said first housing, and an outer surface, said main body being configured so that interior surfaces of said space cover portions of four surfaces of said corner of said first housing;
   an opening formed at the corner of said main body; and
   at least one projection portion formed to protrude from said main body outer surface toward said second housing,
   wherein,
   said projection portion has a contact surface which comes into contact with an inner surface of said second housing, said contact surface being opposite to said inner surface in contact with said outer surface of said first housing,
   said contact surface is formed so as to extend along said inner surface of said second housing, and
   said projection being so configured that it can deform within a space under said second housing to absorb shock.

* * * * *